United States Patent
Morgenshtein et al.

(10) Patent No.: US 8,225,265 B2
(45) Date of Patent: Jul. 17, 2012

(54) LOGIC CIRCUIT DELAY OPTIMIZATION

(75) Inventors: Arkadiy Morgenshtein, Kiryat-Motzkin (IL); Ran Ginosar, Nofit (IL); Avinoam Kolodny, Haifa (IL); Eby G. Friedman, Rochester, NY (US)

(73) Assignee: Technion Research & Development Foundation Ltd., Haifa (IL)

( * ) Notice: Subject to any disclaimer, the term of this patent is extended or adjusted under 35 U.S.C. 154(b) by 618 days.

(21) Appl. No.: 12/292,931

(22) Filed: Dec. 1, 2008

(65) Prior Publication Data

US 2009/0150847 A1   Jun. 11, 2009

Related U.S. Application Data

(60) Provisional application No. 60/991,327, filed on Nov. 30, 2007.

(51) Int. Cl.
*G06F 17/50* (2006.01)

(52) U.S. Cl. .................. 716/132; 716/113; 716/139

(58) Field of Classification Search .................. 716/113, 716/132, 139
See application file for complete search history.

(56) References Cited

U.S. PATENT DOCUMENTS 7,721,236 B2 * 5/2010 Hwang et al. .................. 716/113
* cited by examiner

*Primary Examiner* — Thuan Do

(57) ABSTRACT

A method for modifying a logic circuit layout to optimize circuit propagation delays for improved circuit operation is presented. The layout includes multiple logic gates connected by conductive segments. An initial layout of a physical electronic logic circuit having the plurality of logic gates is input. A respective size is determined for each of the logic gates in accordance with the initial layout and a circuit propagation delay criterion. The circuit propagation delay criterion is a joint function of properties of at least some of the logic gates and at least some of the conductive segments. A modified logic circuit layout is output. The modified logic circuit layout includes a layout of the logic gates arranged in accordance with the initial layout, where each of the logic gates is modified according to the respective determined size, thereby to obtain a modification of the logic circuit layout incorporating an optimized circuit propagation delay.

32 Claims, 18 Drawing Sheets

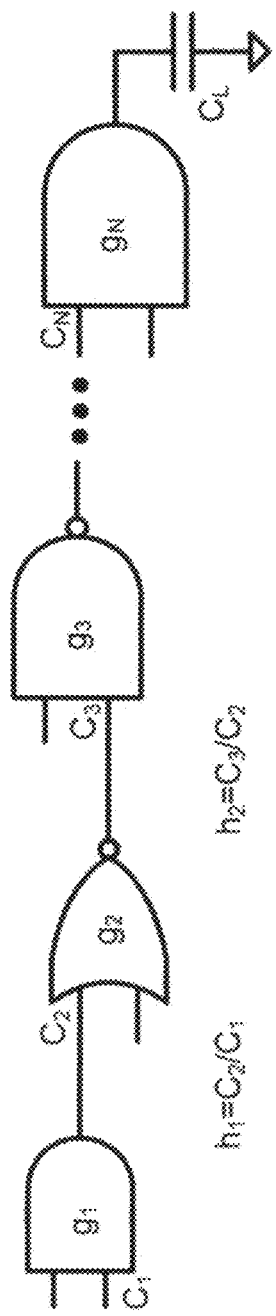
FIG. 1A – Prior Art
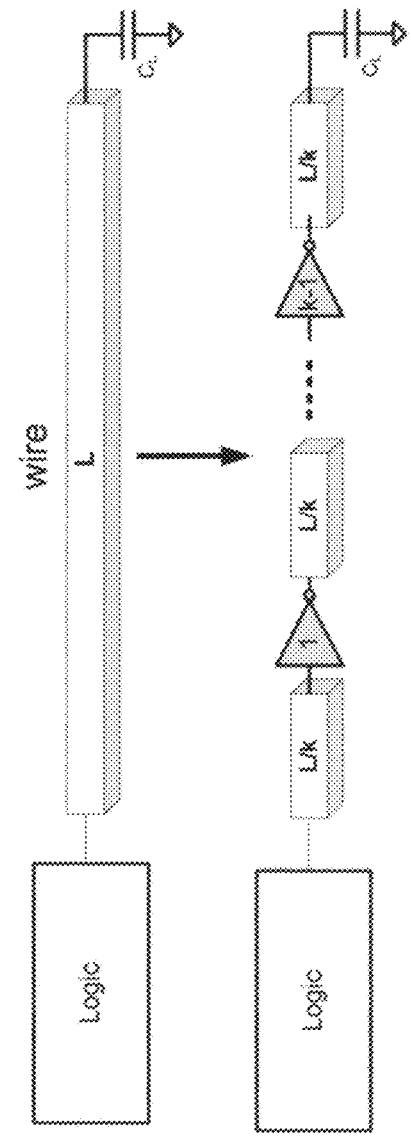
FIG. 1B – Prior Art

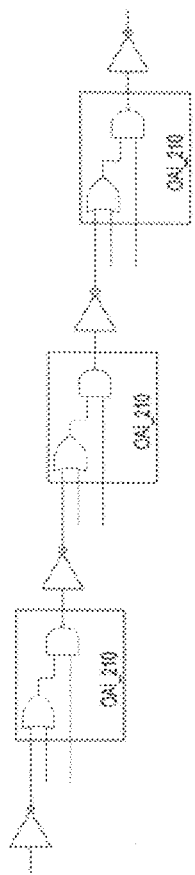
FIG. 14A
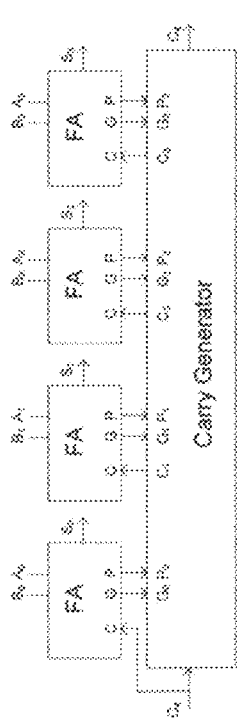
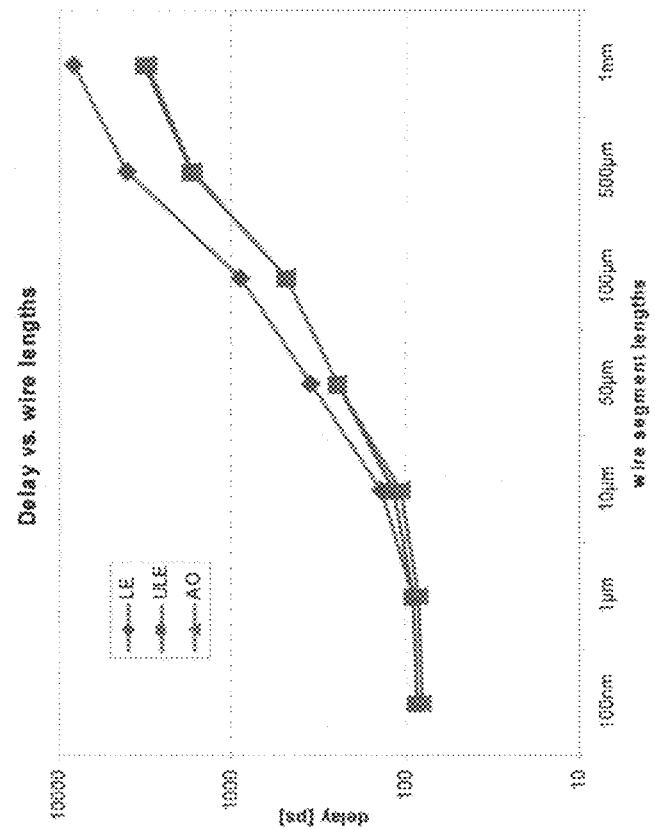
FIG. 14B

LOGIC CIRCUIT DELAY OPTIMIZATION

RELATED APPLICATION/S

This application claims priority from U.S. Provisional Patent Application No. 60/991,327 filed Nov. 30, 2007, the contents which are incorporated by reference as if fully set forth herein.

FIELD AND BACKGROUND OF THE INVENTION

The present invention, in some embodiments thereof, relates to logic circuit design and, more particularly, but not exclusively, to logic circuit design with optimized circuit delay.

Timing modeling and optimization are fundamental tasks in logic circuit design. Existing circuit-level timing optimization techniques address the following cases:
  (i) Circuits where the output wire is absent or relatively short (see FIG. 1A) use the Logical Effort (LE) method that incorporates gate sizing and buffer addition (herein LE), and
  (ii) Circuits where the output drives a high impedance wire (see FIG. 1B) use the repeater insertion (RI) method that is based on interconnect segmentation by optimally scaled inverters.

Extensive research has focused on improving the precision and power efficiency of Logical Effort (see B. Lasbouygues, S. Engels, R. Wilson, P. Maurine, N. Azemard, and D. Auvergne, "Logical Effort Model Extension to Propagation Delay Representation," IEEE Trans. on Computer-Aided Design of Integrated Circuits and Systems, vol. 25, no. 9, pp. 1677-1684, September 2006; A. Kabbani, D. Al-Khalili and A. J. Al-Khalili, "Delay Analysis of CMOS Gates Using Modified Logical Effort Model," IEEE Trans. on Computer-Aided Design of Integrated Circuits and Systems, vol. 24, no. 6, pp. 937-947, June 2005; and J. Ebergen, J. Gainsley, and P. Cunningham, "Transistor Sizing—How to Control the Speed and Energy Consumption of a Circuit," Proc. of the IEEE International Symposium on Asynchronous Circuits and Systems, pp. 51-61, April 2004) and Repeater Insertion (see S. Srinivasaraghavan and W. Burleson, "Interconnect Effort—A Unification of Repeater Insertion and Logical Effort," Proc. of the IEEE Computer Society Annual Symposium on VLSI, pp. 55-61, February 2003; A. Nalamalpu and W. Burleson, "Repeaters Insertion in Deep Submicron CMOS: Ramp-based Analytical Model and Placement Sensitivity Analysis," Proc. of the IEEE Int'l Symposium on Circuits and Systems, pp. 766-769, May 2000; and K. Venkat, "Generalized Delay Optimization of Resistive Interconnections through an Extension of Logical Effort," Proc. of the IEEE Int'l Symposium on Circuits and Systems, pp. 2106-2109, May 1993). However, when observing the domain of timing optimization problems, it is seen that the LE and RI techniques address only the marginal special cases of design. The useful LE rule that the path delay is minimum when the delay of each stage is equal breaks down in presence of wires, because interconnects have fixed capacitances which do not correlate with the characteristics of the gates. On the other hand, the basic RI technique focuses exclusively on the interconnect, without accounting for the logic gates that are typically located at the wire terminals. The existing techniques are unrelated, and none of them is suitable for solution of a general design case, combining logic gates and wires.

In U.S. Pat. No. 6,629,301, Sutherland et al. present an apparatus and method for finding suitable transistor sizes for complex logic networks. An electrical "logical effort model" of a logic circuit is made by replacing each logic element with a simple electrical model and retaining the wiring topology of the original circuit. The logical effort model is a DC circuit with parameters that depend only on the gain chosen for the logic elements in the critical path, the stray capacitance of critical connections, and the logical effort of each logic element. In working on the electrical model, the circuit simulator merely solves the set of simultaneous equations implied by the model.

In U.S. Pat. No. 6,435,446, van Ginneken presents an automated method for designing an integrated circuit layout using a computer based upon an electronic circuit description and based upon cells which are selected from a cell library, each of the cells having an associated area. The method comprises the steps of: (a) placing each of the cells in the integrated circuit layout so that the cells can be coupled together by wires to form a circuit path having an associated predetermined delay constraint wherein the cells are coupled together based upon the electronic circuit description input to the computer; (b) connecting the cells together with the wires to form the circuit path; and (c) adjusting an area of at least one of the cells to satisfy the associated predetermined delay constraint of the circuit path.

In U.S. Pat. No. 7,127,687, Signore presents a method of determining at least one ratio of transistor sizes. The method includes creating a sizing model by replacing at least one logic element in a circuit description with a sizing element that includes a piece-wise-linear current source. The method also includes determining a steady state solution to the sizing mode and determining at least one ratio of transistor sizes from the steady state solution. The method may also include determining at least one dimension of a transistor based at least in part upon the ratio of transistor sizes.

Additional background art includes:
  i) H. B. Bakoglu, "Circuits, Interconnections and Packaging for VLSI", Addison-Wesley, pp. 194-219, 1990;
  ii) I. Sutherland, B. Sproull, D. Harris, "Logical Effort—Designing Fast CMOS Circuits", Morgan Kaufmann Publishers, 1999, which is hereby incorporated by reference;
  iii) I. E. Sutherland and R. F. Sproull, "Logical Effort: Designing for Speed on the Back of an Envelope," Proc. of the University of California/Santa Cruz Conference on Advanced Research in VLSI (ARVLSI), pp. 1-16, 1991; and
  iv) M. Moreinis, A. Morgenshtein, I. Wagner, and A. Kolodny, "Logic Gates as Repeaters (LGR) for Area-Efficient Timing Optimization," IEEE Trans. on Very Large Scale Integration Systems, vol. 14, no. 11, pp. 1276-1281, November 2006.

SUMMARY OF THE INVENTION

In current technologies the delays caused by wires and gates along a logic path are tightly coupled. The embodiments below, are based on a single analytic model, denoted herein Unified Logical Effort (ULE), which combines both logic and interconnect propagation delay optimization. Given an initial logic circuit layout, ULE provides optimal logic gate sizing, in accordance with a circuit propagation delay criterion (denoted herein the delay criterion). The delay criterion, and consequently the gate sizing, is based on the properties of both the logic gates along the logic path(s) and of the interconnecting segments between the logic gates.

According to an aspect of some embodiments of the present invention there is provided a method for modifying a logic circuit layout to optimize circuit propagation delays for improved circuit operation. The layout includes multiple logic gates connected by conductive segments. An initial layout of a physical electronic logic circuit having the plurality of logic gates is input. A respective size is determined for each of the logic gates in accordance with the initial layout and a circuit propagation delay criterion. The circuit propagation delay criterion is a joint function of properties of at least some of the logic gates and at least some of the conductive segments. A modified logic circuit layout is output. The modified logic circuit layout includes a layout of the logic gates arranged in accordance with the initial layout, where each of the logic gates is modified according to the respective determined size, thereby to obtain a modification of the logic circuit layout incorporating an optimized circuit propagation delay.

According to some embodiments of the invention, the properties of a logic gate include a respective output resistance and a respective input capacitance.

According to some embodiments of the invention, the properties of a conductive segment include a specified respective segment capacitance and a specified respective segment resistance.

According to some embodiments of the invention, the method further includes specifying a respective length of a conductive segment, and determining the respective segment properties from the specified length.

According to some embodiments of the invention, the delay criterion is a minimum circuit delay.

According to some embodiments of the invention, the determining includes selecting a respective sizing factor for a specified gate, such that a delay due to the respective gate capacitance equals a delay due to the respective specified output resistance.

According to some embodiments of the invention, the determining includes selecting a respective scaling factor for logic gate i equal to:

$$x_{i_{opt}} = \sqrt{\frac{R_0}{(R_{i-1} + R_{w_{i-1}})} \cdot \frac{(C_{i+1} + C_{w_i})}{C_0 \cdot g_i}}$$

where:
 $x_{opti}$ equals the scaling factor;
 $R_0$ equals a specified constant resistance;
 $C_0$ equals a specified constant capacitance;
 $R_{i-1}$ equals a respective output resistance of gate i−1;
 $R_{wi}$ equals a respective resistance of a conductive segment between logic gates i and i+1;
 $C_{i+1}$ equals a respective input capacitance of gate i+1;
 $C_{wi}$ equals a respective capacitance of a conductive segment between logic gates i and i+1; and
 $g_i$ equals the logical effort of gate i, and wherein the logical effort of gate i equals $(R_i*C_i)/(R_0*C_0)$.

According to some embodiments of the invention, the determining is performed iteratively along a logic path in the layout.

According to some embodiments of the invention, the delay criterion is a minimum power-delay product.

According to some embodiments of the invention, the determining includes: obtaining optimal respective input gate capacitances, and determining respective gate sizes in accordance with the obtained capacitances. The input gate capacitance are obtained by solving:

$$C_i^3 \cdot a_1 + C_i^2 \cdot a_2 + C_i \cdot a_3 + a_4 = 0,$$

$$a_1 = 2\left(g_{i-1} + \frac{R_{w_{i-1}} \cdot C_{i-1}}{\tau}\right)$$

$$a_2 = \left(\begin{array}{c} g_{i-1} \cdot (C_{w_{i-1}} + C_{w_i}) + \\ + \frac{R_{w_{i-1}} \cdot C_{i-1} \cdot (0.5 \cdot C_{w_{i-1}} + C_{w_i})}{\tau} + p_{w_i} \cdot C_{i-1} \end{array}\right)$$

$$a_3 = 0$$

$$a_4 = -(g_i \cdot C_{w_i} \cdot C_{i-1} \cdot (C_{i+1} + C_{w_i})).$$

where:
 $C_i$ equals an optimal input gate capacitance of logic gate i,
 $R_{i-1}$ equals a respective output resistance of gate i−1,
 $R_{wi-1}$ equals a respective resistance of a conductive segment between logic gates i−1 and i,
 $C_{i-1}$ equals a respective input capacitance of gate i−1,
 $C_{wi}$ equals a respective capacitance of a conductive segment between logic gates i and i+1,
 $C_{w-i}$ equals a respective capacitance of a conductive segment between logic gates i−1 and i,
 $p_{wi}$ equals the resistive interconnect effort of a conductive segment between logic gates i and i+1,
 $\tau$ equals the delay of a minimum size inverter, and
 $g_i-1$ equals the logical effort of gate i−1, and wherein the logical effort of gate (i−1) equals $(R_{i-1}*C_{i-1})/(R_0*C_0)$.

According to some embodiments of the invention, the determining is further in accordance with at least one of a branch and a fanout within the logic circuit layout.

According to an aspect of some embodiments of the present invention there is provided a method for producing a logic circuit from a modified initial logic circuit layout, to obtain a logic circuit with an optimized circuit propagation delay. The layout includes multiple logic gates connected by conductive segments. The layout specifies a respective type of each of the logic gates and a respective dimension of each of the conductive segments. An initial layout of a physical electronic logic circuit having the plurality of logic gates is input. A respective size is determined for each of the logic gates in accordance with the initial layout and a circuit propagation delay criterion. The circuit propagation delay criterion is a joint function of properties of at least some of the logic gates and at least some of the conductive segments. A modified logic circuit layout is output. The modified logic circuit layout includes a layout of the logic gates and the conductive segments arranged in accordance with the initial layout, where each of the logic gates is modified according to the respective determined size.

According to some embodiments of the invention, the properties of a logic gate include a respective output resistance and a respective input capacitance.

According to some embodiments of the invention, the method further includes determining the respective logic gate properties in accordance with the logic gate type.

According to some embodiments of the invention, the properties of a conductive segment include a respective segment capacitance and a respective segment resistance.

According to some embodiments of the invention, the method further includes determining the conductive segment properties in accordance with a respective specified dimension.

According to some embodiments of the invention, the delay criterion is a minimum circuit delay.

According to some embodiments of the invention, the determining includes selecting a respective sizing factor for a specified gate such that a delay due to the respective gate capacitance equals a delay due to the respective specified output resistance.

According to some embodiments of the invention, the determining includes selecting a respective scaling factor for logic gate i equal to:

$$x_{i_{opt}} = \sqrt{\frac{R_0}{(R_{i-1} + R_{w_{i-1}})} \cdot \frac{(C_{i+1} + C_{w_i})}{C_0 \cdot g_i}}$$

where:
$x_{opti}$ equals the scaling factor;
$R_0$ equals a specified constant resistance;
$C_0$ equals a specified constant capacitance;
$R_{i-1}$ equals a respective output resistance of gate i−1;
$R_{wi}$ equals a respective resistance of a conductive segment between logic gates i and i+1;
$C_{i+1}$ equals a respective input capacitance of gate i+1;
$C_{wi}$ equals a respective capacitance of a conductive segment between logic gates i and i+1; and
$g_i$ equals the logical effort of gate i, and wherein the logical effort of gate i equals $(R_i*C_i)/(R_0*C_0)$.

According to some embodiments of the invention, the delay criterion is a minimum power-delay product.

According to some embodiments of the invention, the determining includes: obtaining optimal respective input gate capacitances, and determining respective gate sizes in accordance with the obtained capacitances. The input gate capacitance are obtained by solving:

$$C_i^3 \cdot a_1 + C_i^2 \cdot a_2 + C_i \cdot a_3 + a_4 = 0,$$

$$a_1 = 2\left(g_{i-1} + \frac{R_{w_{i-1}} \cdot C_{i-1}}{\tau}\right)$$

$$a_2 = \left(\begin{array}{c} g_{i-1} \cdot (C_{w_{i-1}} + C_{w_i}) + \\ + \frac{R_{w_{i-1}} \cdot C_{i-1} \cdot (0.5 \cdot C_{w_{i-1}} + C_{w_i})}{\tau} + p_{w_i} \cdot C_{i-1} \end{array}\right)$$

$$a_3 = 0$$

$$a_4 = -(g_i \cdot C_{w_i} \cdot C_{i-1} \cdot (C_{i+1} + C_{w_i})).$$

where:
$C_i$ equals an optimal input gate capacitance of logic gate i,
$R_{i-1}$ equals a respective output resistance of gate i−1,
$R_{wi-1}$ equals a respective resistance of a conductive segment between logic gates i−1 and i,
$C_{i-1}$ equals a respective input capacitance of gate i−1,
$C_{wi}$ equals a respective capacitance of a conductive segment between logic gates i and i+1,
$C_{w-i}$ equals a respective capacitance of a conductive segment between logic gates i−1 and i,
$p_{wi}$ equals the resistive interconnect effort of a conductive segment between logic gates i and i+1,
$\tau$ equals the delay of a minimum size inverter, and
$g_i-1$ equals the logical effort of gate i−1, and wherein the logical effort of gate (i−1) equals $(R_{i-1}*C_{i-1})/(R_0*C_0)$.

According to some embodiments of the invention, the determining is further in accordance with at least one of a branch and a fanout within the logic circuit layout.

According to some embodiments of the invention, the

According to an aspect of some embodiments of the present invention there is provided an apparatus for providing a logic circuit layout with optimized circuit propagation delay. The layout includes multiple logic gates connected by conductive segments. The apparatus includes a layout input unit, a sizing unit and a layout output unit. The layout input unit is used to specify an initial layout of an electronic logic circuit having the plurality of logic gates connected by the conductive segments. The sizing unit determines a respective size for each of the logic gates in accordance with the initial layout and a circuit delay criterion, wherein the circuit design criterion is a joint function of properties of at least some of the logic gates and at least some of the conductive segments. The layout output unit outputs a modified layout, wherein the modified layout includes a layout of the logic gates arranged in accordance with the initial layout, each of the logic gates being modified according to the respective determined size. Thereby a logic circuit layout incorporating an optimized circuit propagation delay is obtained.

According to some embodiments of the invention, the properties of a logic gate include a respective output resistance and a respective input capacitance.

According to some embodiments of the invention, the properties of a conductive segment include a specified respective segment capacitance and a specified respective segment resistance.

According to some embodiments of the invention, the layout input unit is configured to input a respective length of a conductive segment, and to determine the respective segment properties from the input length.

According to some embodiments of the invention, the delay criterion is a minimum circuit delay.

According to some embodiments of the invention, the sizing unit is configured to determine the respective sizes by selecting a respective sizing factor for a specified gate such that a delay due to the respective gate capacitance equals a delay due to the respective specified output resistance.

According to some embodiments of the invention, the sizing unit is configured to select a respective scaling factor for logic gate i equal to:

$$x_{i_{opt}} = \sqrt{\frac{R_0}{(R_{i-1} + R_{w_{i-1}})} \cdot \frac{(C_{i+1} + C_{w_i})}{C_0 \cdot g_i}}$$

where:
$x_{opti}$ equals the scaling factor;
$R_0$ equals a specified constant resistance;
$C_0$ equals a specified constant capacitance;
$R_{i-1}$ equals a respective output resistance of gate i−1;
$R_{wi}$ equals a respective resistance of a conductive segment between logic gates and i+1;
$C_{i+1}$ equals a respective input capacitance of gate i+1;
$C_{wi}$ equals a respective capacitance of a conductive segment between logic gates i and i+1; and
$g_i$ equals the logical effort of gate i, and wherein the logical effort of gate i equals $(R_i*C_i)/(R_0*C_0)$.

According to some embodiments of the invention, the sizing unit is configured to perform the determining iteratively along a logic path in the layout.

According to some embodiments of the invention, the delay criterion is a minimum power-delay product.

According to some embodiments of the invention, the sizing unit is configured to determine respective gate sizes in accordance with input gate capacitances, and further configured to determine the input gate capacitances by solving:

$$C_i^3 \cdot a_1 + C_i^2 \cdot a_2 + C_i \cdot a_3 + a_4 = 0,$$

$$a_1 = 2\left(g_{i-1} + \frac{R_{w_{i-1}} \cdot C_{i-1}}{\tau}\right)$$

$$a_2 = \begin{pmatrix} g_{i-1} \cdot (C_{w_{i-1}} + C_{w_i}) + \\ + \dfrac{R_{w_{i-1}} \cdot C_{i-1} \cdot (0.5 \cdot C_{w_{i-1}} + C_{w_i})}{\tau} + p_{w_i} \cdot C_{i-1} \end{pmatrix}$$

$$a_3 = 0$$

$$a_4 = -(g_i \cdot C_{w_i} \cdot C_{i-1} \cdot (C_{i+1} + C_{w_i})).$$

where:

$C_i$ equals an optimal input gate capacitance of logic gate i, $R_{i-1}$ equals a respective output resistance of gate i−1, $R_{wi-1}$ equals a respective resistance of a conductive segment between logic gates i−1 and i, $C_{i-1}$ equals a respective input capacitance of gate i−1, $C_{wi}$ equals a respective capacitance of a conductive segment between logic gates i and i+1, $C_{w-i}$ equals a respective capacitance of a conductive segment between logic gates i−1 and i, $p_{wi}$ equals the resistive interconnect effort of a conductive segment between logic gates i and i+1, τ equals the delay of a minimum size inverter, and $g_i$−1 equals the logical effort of gate i−1, and wherein the logical effort of gate (i−1) equals $(R_{i-1}*C_{i-1})/(R_0*C_0)$.

According to some embodiments of the invention, the sizing unit is configured to determine the respective sizes in accordance with at least one of a branch and a fanout within the logic circuit layout.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is a simplified circuit diagram of a logic circuit modeled with an absent or relatively short output wire;

FIG. 1B is a simplified circuit diagram of a logic circuit with an output that drives a high impedance wire;

FIG. 14A is a simplified circuit diagram of a carry-lookahead adder;

FIG. 14B is a graph of the delay for a carry-lookahead adder;

DESCRIPTION OF SPECIFIC EMBODIMENTS OF THE INVENTION

Figure 2:
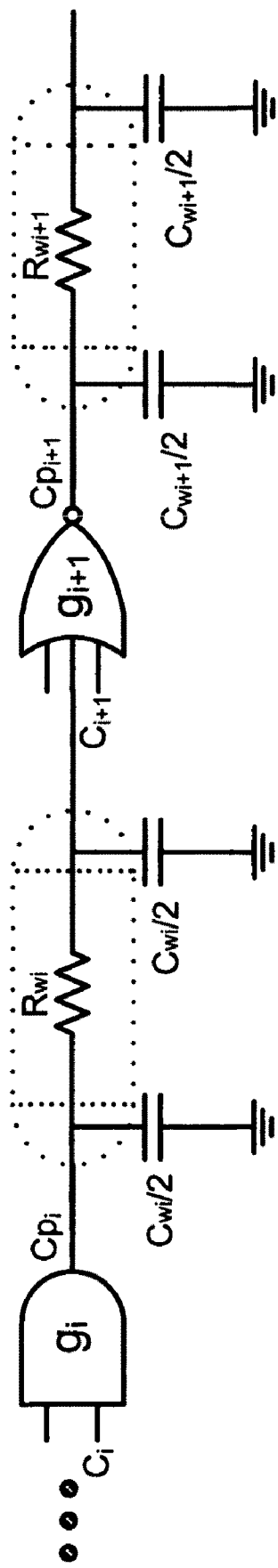
FIG. 2 is a model of an exemplary logic circuit composed of logic gates interconnected by conductive segments.

The present invention, in some embodiments thereof, relates to logic circuit design and, more particularly, but not exclusively, to logic circuit design with optimized circuit delay.

In logic circuit design the general timing optimization problem may be defined as reducing the delay of a logic path propagating over a distance from point A to point B while performing a logical function F. The embodiments presented below describe methods and apparatus for obtaining a logic circuit with logic gate sizes which meet a propagation delay criterion, such as minimum total propagation delay. The delay criterion takes into account properties of both the logic gates themselves and the interconnecting conductive segments.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

I) The ULE Model

For purposes of better understanding some embodiments of the present invention, as illustrated in FIGS. 3-16C of the drawings, reference is first made to FIG. 2, which is a model of a logic circuit composed of logic gates interconnected by conductive segments. The Elmore delay model known in the art is used to describe the wire delay (see W. C. Elmore. *The Transient Analysis of Damped Linear Networks with Particular Regard to Wideband Amplifiers*. J. Applied Physics, vol. 19(1), 1948).

For the logic circuit illustrated in FIG. 2, the total combined delay expression obtained is:

$$D_i = R_i \cdot (C_{p_i} + C_{w_i} + C_{i+1}) + R_{w_i} \cdot (0.5 \cdot C_{w_i} + C_{i+1}), \quad (1)$$

where $R_i$ is the effective output resistance of the gate i, CP is the parasitic output capacitance of gate i, $C_{w_i}$ and $R_{w_i}$ are, respectively, the wire capacitance and resistance of segment i, and $C_{i+1}$ is the input capacitance of gate i+1. Eqn. 1 is rewritten by introducing the delay of a minimum size inverter as a technology constant $\tau = R_0 \cdot C_0$, where $R_0$ and $C_0$ are the output resistance and input capacitance of a minimum sized inverter, respectively:

$$D_i = \tau \cdot d_i = \tau \cdot \left[ \frac{R_i}{R_0} \cdot \frac{(C_{w_i} + C_{i+1} + C_{P_i})}{C_0} + \frac{R_{w_i}}{R_0 \cdot C_0} \cdot (0.5 \cdot C_{w_i} + C_{i+1}) \right]. \quad (2)$$

The stage delay, normalized with respect to a minimum inverter delay $\tau$, is expressed as:

$$d_i = g_i \cdot \left( h_i + \frac{C_{w_i}}{C_i} \right) + \frac{R_{w_i} \cdot (0.5 \cdot C_{w_i} + C_{i+1})}{\tau} + p_i, \quad (3)$$

where $g_i = (R_i \cdot C_i)/(R_0 \cdot C_0)$ is related to the gate topology, $h_i = C_{i+1}/C_i$ is the electrical effort describing the driving capability, and $p_i = (R_i \cdot C_{p_i})/(R_0 \cdot C_0)$ is the delay factor of the parasitic impedance. The capacitance and resistance of the gate are related to the scaling factor $x_i$ as $C_i = C_0 \cdot g_i \cdot x_i$ and $R_i = R_0/x_i$, respectively.

The capacitive interconnect effort $h_w$ and the resistive interconnect effort $p_w$ are respectively:

$$h_{w_i} = \frac{C_{w_i}}{C_i}, \quad (4)$$

$$p_{w_i} = \frac{R_{w_i} \cdot (0.5 \cdot C_{w_i} + C_{i+1})}{\tau}. \quad (5)$$

As shown in Eqn. 4, $h_w$ expresses the influence of the wire capacitance on the electrical effort of the gate. The component $p_w$ in Eqn. 5 is the delay of the loaded wire in terms of the gate delay $\tau$.

The final expression of the ULE delay for a single stage is $$d = g \cdot (h + h_w) + (p + p_w). \quad (6)$$

The ULE delay expression for an N stage logic path with wires is $$d = \sum_{i=1}^{N} g_i \cdot (h_i + h_{w_i}) + (p_i + p_{w_i}). \quad (6)$$

II. General Approach to Logic Gate Sizing

Figure 3:
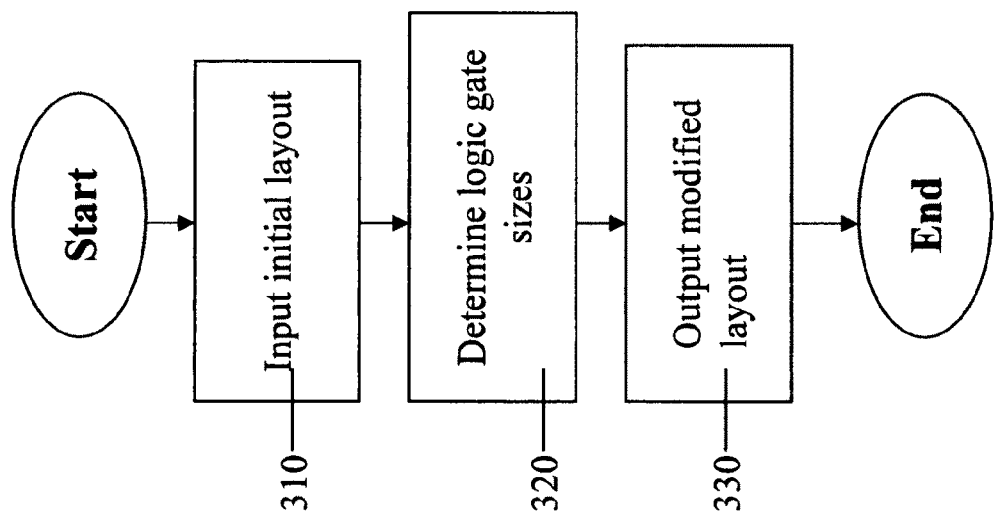
FIG. 3 is a simplified flowchart of a method for providing a logic circuit design, according to an embodiment of the present invention.

Reference is now made to FIG. 3, which is a simplified flowchart of a method for modifying a logic circuit layout, according to an embodiment of the present invention. The logic circuit design is based on an initial circuit layout, which includes multiple logic gates connected by conductive segments, typically wires. The initial layout may also include input and/or output conductive segments that are connected to a single logic gate. Both the logic gates and the conductive segments may be specified by their properties, such as resistance and conductance, or in any other manner in which their properties may be determined. For example, a logic gate may be specified by type (e.g. NAND gate) or a conductive segment may be specified by its dimensions (e.g. length).

In 310, an initial layout of a physical electronic logic circuit is input. The initial layout includes multiple logic gates which are connected by conductive segments. The initial layout describes the interconnection between the logic gates, and may further include input and output conductive segments. The initial layout may be input in any way known in the art, for example as a data file produced by a computer-aided design (CAD) tool. The initial layout may or may not show the location of the logic gates and conductive elements within the physical circuit.

As used herein the term "logic gate" means a circuit element which performs a logic function. As used herein the term "conductive segment" means a conductor, for example a wire, through which the logic signal propagates along the logic path. In the following, the term wire is used to denote a conductive segment for clarity purposes, however this term is not intended to be limiting and any other suitable type of conductive segment may be used.

In 320, a respective size is determined for each of the logic gates, in accordance with the initial layout and a delay criterion. The delay criterion is a joint function of properties of at least some of the logic gates and at least some of the conductive segments included in the initial layout. In some embodiments, the properties of a logic gate include a respective output resistance and a respective input capacitance. In some embodiments, the properties of a conductive segment include a specified respective segment capacitance and a specified respective segment resistance. As discussed above, some or all of the segments and/or logic gates may be determined from their type and/or dimensions.

In 330 a modified layout of the logic circuit is output. The modified layout (denoted herein the design) includes the logic gates arranged in accordance with the initial layout. The size of the logic gates is modified to the respective sizes determined in 320. In this manner a logic circuit design with an optimized circuit delay is provided.

As used herein the term "design" means any manner of specifying the modified layout, including the respective gates sizes, for example as a data file or as a circuit diagram.

Examples of respective embodiments for several delay criteria are discussed in more detail below.

III. Total Delay Criterion

In some embodiments the delay criterion utilized is the total delay criterion, which minimizes the total delay over the logic path. In the embodiment discussed below, the wire properties comprise the wire resistance and capacitance, $R_{wi}$ and $C_{wi}$, and the logic gate properties comprise the gate capacitance and resistance, $R_i$ and $C_i$.

As the first step in delay optimization in accordance with the minimum circuit delay criterion, consider the two-stage portion of a logic path with wires illustrated in FIG. 2. In this case, the ULE expression for the total delay is:

$$d = g_i(h_i + h_{w_i}) + (p_i + p_{w_i}) + g_{i+1}(h_{i+1} + h_{w_{i+1}}) + (p_{i+1} + p_{w_{i+1}}) \quad (8)$$

where the electrical effort of each stage is $h_i = C_{i+1}/C_i$ and $h_{i+1} = C_{i+2}/C_{i+1}$.

Substituting $C_{i+1} = h_i \cdot C_i$ into Eqn. 8 in the presence of resistive interconnect, the delay may be expressed in terms of $h_i$ as:

$$d = g_i \cdot \left(h_i + \frac{C_{w_i}}{C_i}\right) + p_i + \frac{R_{w_i} \cdot (0.5 \cdot C_{w_i} + h_i \cdot C_i)}{R_0 \cdot C_0} + g_{i+1} \cdot \left(\frac{C_{i+2} + C_{w_{i+1}}}{h_i \cdot C_i}\right) + p_{i+1} + p_{w_{i+1}}. \quad (9)$$

The resulting expression of the minimal delay criterion is:

$$\frac{\partial d}{\partial h_i} = g_i + \frac{R_{w_i} \cdot C_i}{R_0 \cdot C_0} - g_{i+1} \cdot \left(\frac{C_{i+2} + C_{w_{i+1}}}{h_i^2 \cdot C_i}\right) = 0, \quad (10)$$

An expression for the optimal respective sizing of the logic gates is derived as follows. Solving Eqn. 10 gives:

$$h_i = \sqrt{\frac{g_{i+1}}{g_i + \frac{R_{w_i} \cdot C_i}{R_0 \cdot C_0}} \cdot \left(\frac{C_{i+2}}{C_i} + \frac{C_{w_{i+1}}}{C_i}\right)}. \quad (11)$$

Substituting $C_{i+2}/C_i = h_i \cdot h_{i+1}$ and $C_{w_{i+1}}/C_i = h_i \cdot h_{w_{i+1}}$:

$$h_i = \sqrt{\frac{g_{i+1}}{g_i + \frac{R_{w_i} \cdot C_i}{R_0 \cdot C_0}} \cdot (h_i \cdot h_{i+1} + h_i \cdot h_{w_{i+1}})}. \quad (12)$$

The general condition of the electrical effort for minimal delay of logic stage i with RC interconnect is:

$$\left(g_i + \frac{R_{w_i} \cdot C_i}{R_0 \cdot C_0}\right) \cdot h_i = g_{i+1} \cdot (h_{i+1} + h_{w_{i+1}}). \quad (13)$$

Consequently, in some embodiments the respective size of logic gate i+1 is by setting the delay component due to the gate capacitance equal to the delay component due to the effective resistance of the gate, as may be seen as follows. Multiplying both sides of Eqn. 13 by $R_0 \cdot C_0$, and using the relationships $h_i = C_{i+1}/C_i$, $C_i = C_0 \cdot g_i \cdot x_i$ and $R_i = R_0/x_i$ gives the optimum size of gate i+1 as:

$$(R_i + R_{w_i}) \cdot C_{i+1} = R_{i+1} \cdot (C_{i+2} + C_{w_{i+1}}). \quad (14)$$

where the left side of Eqn. 14 is the delay component due to the gate capacitance and the right side of Eqn. 14 is the delay component due to the effective resistance of the gate.

Figure 4:
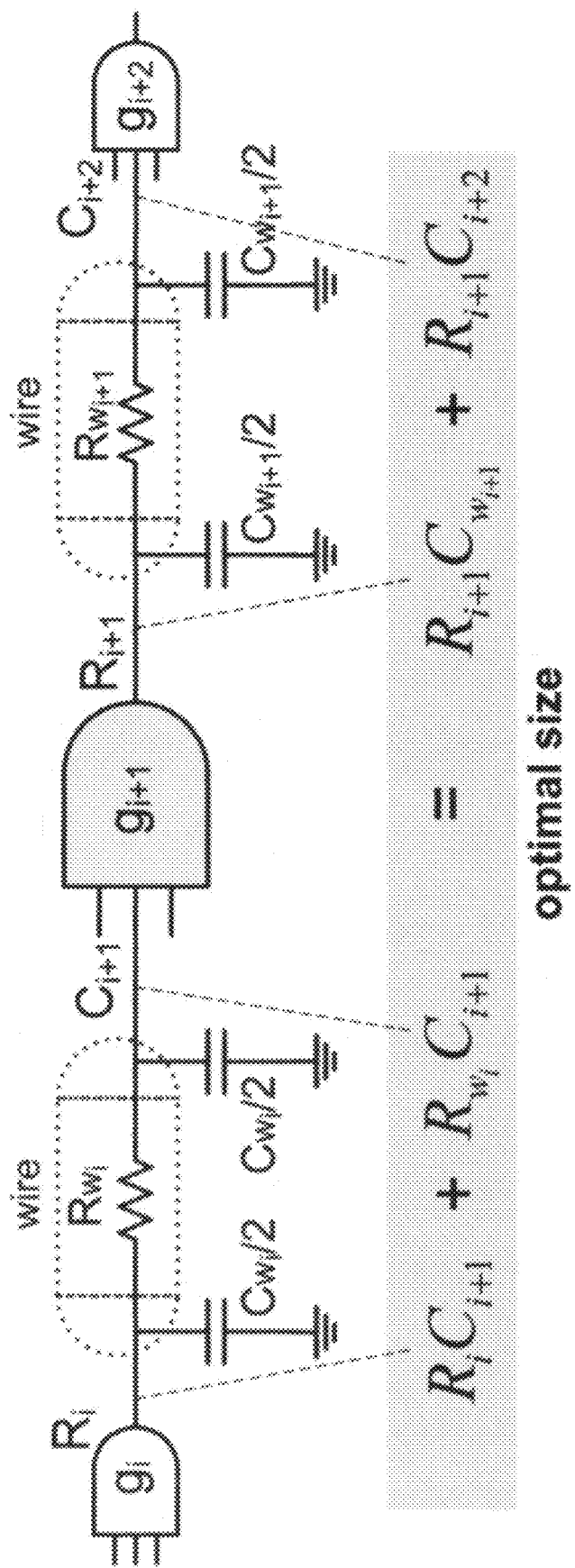
FIG. 4 is a schematic model illustrating related delay components for a logic circuit which includes three logic gates.

Reference is now made to FIG. 4, which is a schematic model illustrating the related delay components. Note that other delay components ($R_i \cdot C_{w_i}$, $0.5 \cdot R_{w_i} \cdot C_{w_i}$, and $R_{w_i} \cdot (0.5 \cdot C_{w_{i+1}} + C_{i+2})$) are independent of the size of gate i+1 and do not influence the optimum size for the minimum delay criterion. Also note that in the presence of wires, the condition for minimum path delay does not correspond to equal delay or to equal effort at every stage along the path.

The optimum condition expressed by Eqn. 14 may be further developed for any gate i based on the characteristic that the total delay $D_i$ is comprised of the sum of the upstream delay, $D_{R_i}$, and the downstream delay, $D_{C_i}$:

$$D_{C_i} = (R_{i-1} + R_{w_{i-1}}) \cdot C_i = (R_{i-1} + R_{w_{i-1}}) \cdot C_0 \cdot g_i \cdot x_i, \quad (15)$$

$$D_{R_i} = R_i \cdot (C_{i+1} + C_{w_i}) = \frac{R_0}{x_i} \cdot (C_{i+1} + C_{w_i}),$$

$$D_i = D_{C_i} + D_{R_i} + \text{const.}$$

When the total delay is minimum, the sum of the differential of the delay components with respect to the sizing factor $x_i$ is equated to zero:

$$\frac{\partial D_{C_i}}{\partial x_i} = (R_{i-1} + R_{w_{i-1}}) \cdot C_0 \cdot g_i, \quad (16)$$

$$\frac{\partial D_{R_i}}{\partial x_i} = -\frac{R_0}{x_i^2} \cdot (C_{i+1} + C_{w_i}).$$

Thus:

$$\frac{\partial D_i}{\partial x_i} = \frac{\partial D_{C_i}}{\partial x_i} + \frac{\partial D_{R_i}}{\partial x_i} = 0. \quad (17)$$

In some embodiments, determining a respective size for each logic gates includes selecting a respective scaling factor for logic gate i equal to:

$$x_{i_{opt}} = \sqrt{\frac{R_0}{(R_{i-1} + R_{w_{i-1}})} \cdot \frac{(C_{i+1} + C_{w_i})}{C_0 \cdot g_i}}. \quad (18)$$

as given by the solution of Eqn. 17.

When $x_{i_{opt}}$ of Eqn. 18 is substituted into Eqn. 14, a general gate size condition is given as:

$$(R_{i-1} + R_{w_{i-1}}) \cdot C_i = R_i \cdot (C_{i+1} + C_{w_i}) = \sqrt{[(R_{i-1} + R_{w_{i-1}}) \cdot C_0 \cdot g_i] \cdot [R_0 \cdot (C_{i+1} + C_{w_i})]}. \quad (19)$$

An intuitive interpretation of Eqn. 19 is that the minimum delay is achieved when the downstream delay component (due to $C_i$) and the upstream delay component (due to $R_i$) of an optimally sized gate are both equal to the geometric mean of the upstream and downstream delays obtained if the gate is minimally sized:

$$D_{R_{i_{opt}}} = D_{C_{i_{opt}}} = D^* \equiv GM[D_{R_{i_{min}}}, D_{C_{i_{min}}}]. \quad (20)$$

Figure 5:
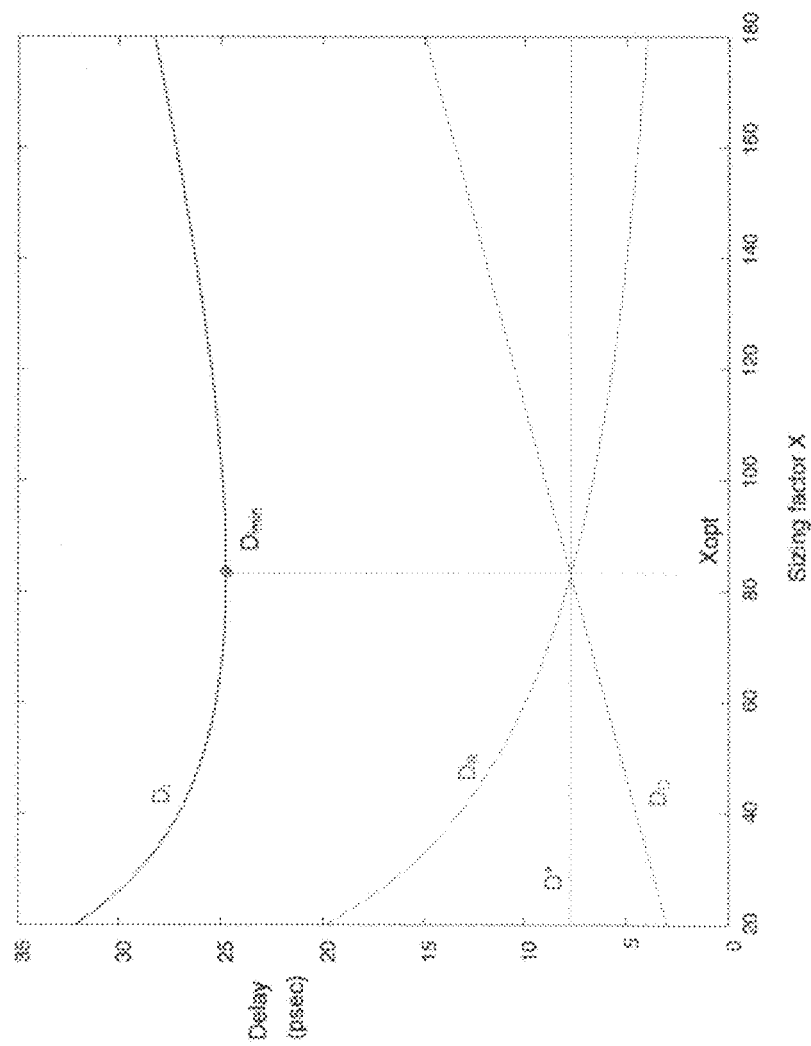
FIG. 5 is a graph which illustrates the dependence of the delay on the sizing factor.

FIG. 5 is a graph which shows the dependence of the delay on the sizing factor. Observe that choosing sizing factors different from $x_{opt}$ will increase the delay. The total delay $D_i$ comprises four components: the constant delays $0.5 \cdot R_{w_{i-1}} C_{w_{i-1}}$ and $0.5 \cdot R_{w_i} C_{w_i}$, and the variable delays $D_{C_i} = (R_{i-1} + R_{w_{i-1}}) \cdot C_i$ and $D_{R_i} = R_i \cdot (C_{i+1} + C_{w_i})$ that are dependent on the sizing factor $x_i$. The value of the sizing factor $x_{opt}$ is obtained at the intersection of the three curves, $D_{R_i}$, $D_{C_i}$, and $$D^* = GM[D_{R_{i_{min}}}, D_{C_{i_{min}}}],$$

as described in Eqn. 20 and illustrated in FIG. 5 (for the case of a NAND gate with Li=100 μm, $L_{i-1}$=1 mm, $C_{i-1}$=$C_0$, and $C_{i+1}$=10$C_0$).

By applying the optimum condition to each pair of gates along a path, all of the interconnect components are considered. The optimum condition represented by Eqn. 13 addresses resistive interconnect. In the case of short local wires, the interconnect effort may be simplified by only considering the capacitive component of the interconnect impedance:

$$g_i \cdot h_i = g_{i+1} \cdot (h_{i+1} + h_{w_{i+1}}). \quad (21)$$

The driving ability of a gate is related to the size of the gate and may be represented by a ratio of input capacitances (see I. Sutherland, B. Sproull, D. Harris, "Logical Effort—Designing Fast CMOS Circuits", Morgan Kaufmann Publishers, 1999). The optimum condition in Eqn. 13 may be rewritten in order to develop an expression for the input capacitance of each gate using the ULE model:

$$C_{i_{opt}} = \sqrt{\frac{g_i}{g_{i-1} + \frac{R_{w_{i-1}} \cdot C_{i-1}}{R_0 \cdot C_0}} \cdot C_{i-1} \cdot (C_{i+1} + C_{w_i})} = \quad (22)$$

$$= \sqrt{C_{i-1} \cdot C_{i+1}} \cdot \sqrt{\left(1 + \frac{C_{w_i}}{C_{i+1}}\right)} \cdot \sqrt{\frac{g_i}{g_{i-1} + \frac{R_{w_{i-1}} \cdot C_{i-1}}{R_0 \cdot C_0}}}.$$

In the case of a capacitive wire or branch, the expression for the gate size reduces to $$C_{i_{opt}} = \sqrt{C_{i-1} \cdot C_{i+1}} \cdot \sqrt{\left(1 + \frac{C_{w_i}}{C_{i+1}}\right)} \cdot \sqrt{\frac{g_i}{g_{i-1}}}. \quad (23)$$

The expressions in Eqn. 22 and Eqn. 23 illustrate the quadratic relationship between the sizes of the neighboring gates. The gate size based on ULE may be determined by solving a set of N polynomial expressions for the N gates along the path.

In some embodiments the respective gates sizes are determined iteratively in order to simplify the solution by using a relaxation method. An iterative calculation is performed along the path while applying the above-described conditions. Each capacitance along the path is iteratively replaced by the capacitance determined from applying the expression of Eqn. 22 or Eqn. 23 to two neighboring logic gates IV) Gate Sizing for Long Wires In this section, the delay model of a logic gate with long wires is investigated in terms of the optimal size. It is seen below that in the case of long wire segments, the gate sizing optimization process converges to the scale factor $x_{opt}$. This scale factor is independent of wire length in the case of equal interconnect segments.

Figure 6:
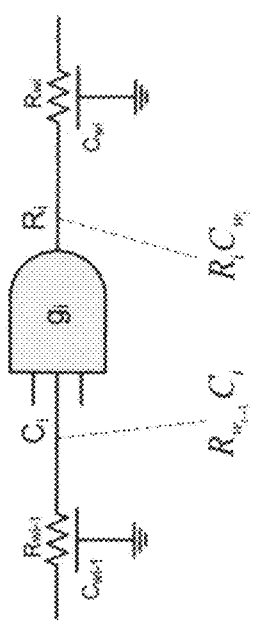
FIG. 6 is a schematic model of a logic circuit with long wires.

When long wires are assumed, the impedances $C_{w_i}$ and $R_{w_{i-1}}$ of Eqn. 22 become dominant as compared to the gate impedances. A schematic model of this case is shown in FIG. 6.

The scale factor of a general gate may be derived from Eqn. 18 for the case of long wires:

$$x_{opt_i} \cong \sqrt{\frac{R_0 \cdot C_{w_i}}{R_{w_{i-1}} \cdot C_0 \cdot g_i}} = \sqrt{\frac{c_w \cdot R_0}{r_w \cdot C_0 \cdot g_i}} \cdot \sqrt{\frac{L_i}{L_{i-1}}} \quad (24)$$

using the relationships, $C_{w_i} = C_w \cdot L_i$, and $R_{w_i} = r_w \cdot L_i$, where $r_w$ and $c_w$ are the resistance and capacitance of the wire per unit length, and $L_i$ and $L_{i-1}$ are the length of the wires before and after the logic gate $g_i$, respectively. Note that the gate's scale factor in the case of long wires depends only upon the ratio of the adjacent wire lengths.

When the resistance and capacitance of the wires are dominant, the optimum condition of Eqn. 14 is transformed to $$R_i \cdot C_{w_i} = C_i \cdot R_{w_{i-1}}. \quad (25)$$

An intuitive explanation of Eqn. 25 is that the optimum size condition is achieved when the delay component $R_{w_{i-1}} \cdot C_i$ due to the gate capacitance is equal to the delay component $R_i \cdot C_{w_i}$ due to the effective resistance of the gate.

A general optimum condition may be derived similarly to Eqn. 19:

$$R_{w_{i-1}} \cdot C_i = R_i \cdot C_{w_i} = \sqrt{[R_{w_{i-1}} \cdot C_0 \cdot g_i] \cdot [R_0 \cdot C_{w_i}]}. \quad (26)$$

The meaning of Eqn. 26 is that the minimum delay is achieved when the downstream and the upstream delay components of an optimally sized gate are both equal to the geometric mean of the downstream and the upstream delays that would be obtained for a minimum sized gate.

In the special case of equal wire segments, the capacitance and resistance of all the segments are equal to $C_w$ and $R_w$ respectively. In this case, the scaling factor $x_{opt}$ is independent of the wire length since the component $C_w/R_w$ is independent of the wire length. The optimum condition may be rewritten as a function of the capacitance and resistance per unit length, $C_w$ and $r_w$:

$$x_{opt_i} = \sqrt{\frac{R_0 \cdot c_w}{r_w \cdot C_0 \cdot g_i}}. \quad (27)$$

For the special case of inverter-based repeater insertion (with an electrical effort g=1), the condition of Eqn. 27 reduces to:

$$x_{opt} = \sqrt{\frac{R_0 \cdot c_w}{r_w \cdot C_0}}. \quad (28)$$

This optimal sizing factor is the same as for optimal repeater scaling (see H. B. Bakoglu, "Circuits, Interconnections and Packaging for VLSI", Addison-Wesley, pp. 194-219, 1990).

In addition, similarly to Eqn. 25, the optimal sizing condition for a repeater is:

$$R_{rep} \cdot C_w = C_{rep} \cdot R_w. \quad (29)$$

It is seen that according to the present criterion, the best sizing of a repeater is achieved when the delay component $R_w \cdot C_{rep}$ due to the repeater capacitance is equal to the delay component $R_{rep} \cdot C_w$ due to the effective resistance of the repeater.

The application of ULE to repeater insertion provides a solution to some specific design problems. Two examples are presented here:

i) Layout constraint: Given a wire of total length L comprising two segments of lengths $L_1$ and $L_2$, the optimal size of the repeater located between the segments is:

$$x_{rep_{opt}} = \sqrt{\frac{c_w \cdot R_0}{r_w \cdot C_0 \cdot g_i}} \cdot \sqrt{\frac{L_2}{L_1}}. \quad (30)$$

ii) Cell size constraint: Given a repeater of size $x_{rep}$ dividing a wire of total length L into two segments, the optimal segment lengths $L_{1_{opt}}$ and $L_{2_{opt}} = L - L_{1_{opt}}$ are:

$$\frac{L_{2_{opt}}}{L_{1_{opt}}} = x_{rep}^2 / \left(\frac{c_w \cdot R_0}{r_w \cdot C_0 \cdot g_i}\right). \quad (31)$$

V) Gate Sizing for Power-Delay Product Minimization

Sizing gates for minimum delay may result in large gate sizes which dissipate significant power. In some embodiments, the delay criterion selected is the minimization of the power-delay product (denoted herein the power-delay criterion). The power-delay criterion may result in smaller gate sizes for some or all of the logic gates, while trading off delay and power.

The delay of a two stage logic chain (see FIG. 2) is described in Eqn. 9 and is a function of $h_i$. The dynamic power is represented by the capacitance of the gate i+1 and the wire capacitance:

$$P \propto (C_{i+1} + C_{w_{i+1}}) = C_i \cdot h_i + C_{w_{i+1}}. \quad (32)$$

In order to determine the logic gate sizes using a power-delay criterion, optimal respective input gate capacitances are first determined. The respective gate sizes are then determined from the input gate capacitances. The optimal input gate capacitances are determined by setting the derivative of the power-delay product to zero. This results in the following expression for the optimal input capacitance $C_i$:

$$C_i^3 \cdot a_1 + C_i^2 \cdot a_2 + C_i \cdot a_3 + a_4 = 0, \quad (33)$$

$$a_1 = 2\left(g_{i-1} + \frac{R_{w_{i-1}} \cdot C_{i-1}}{\tau}\right)$$

$$a_2 = \begin{pmatrix} g_{i-1} \cdot (C_{w_{i-1}} + C_{w_i}) + \\ + \frac{R_{w_{i-1}} \cdot C_{i-1} \cdot (0.5 \cdot C_{w_{i-1}} + C_{w_i})}{\tau} + p_{w_i} \cdot C_{i-1} \end{pmatrix}$$

$$a_3 = 0$$

$$a_4 = -(g_i \cdot C_{w_i} \cdot C_{i-1} \cdot (C_{i+1} + C_{w_i})).$$

The polynomial of Eqn. 33 has a single positive real root. The optimization may be performed iteratively, similarly to the ULE delay minimization technique.

VI) Gate Sizing with Fanout and Branches—Extended ULE

The discussion above was directed to a logic path which does not include branches or fanout. The following section extends the above-described embodiments to logic circuits which include branches and/or fanout.

Figure 7:
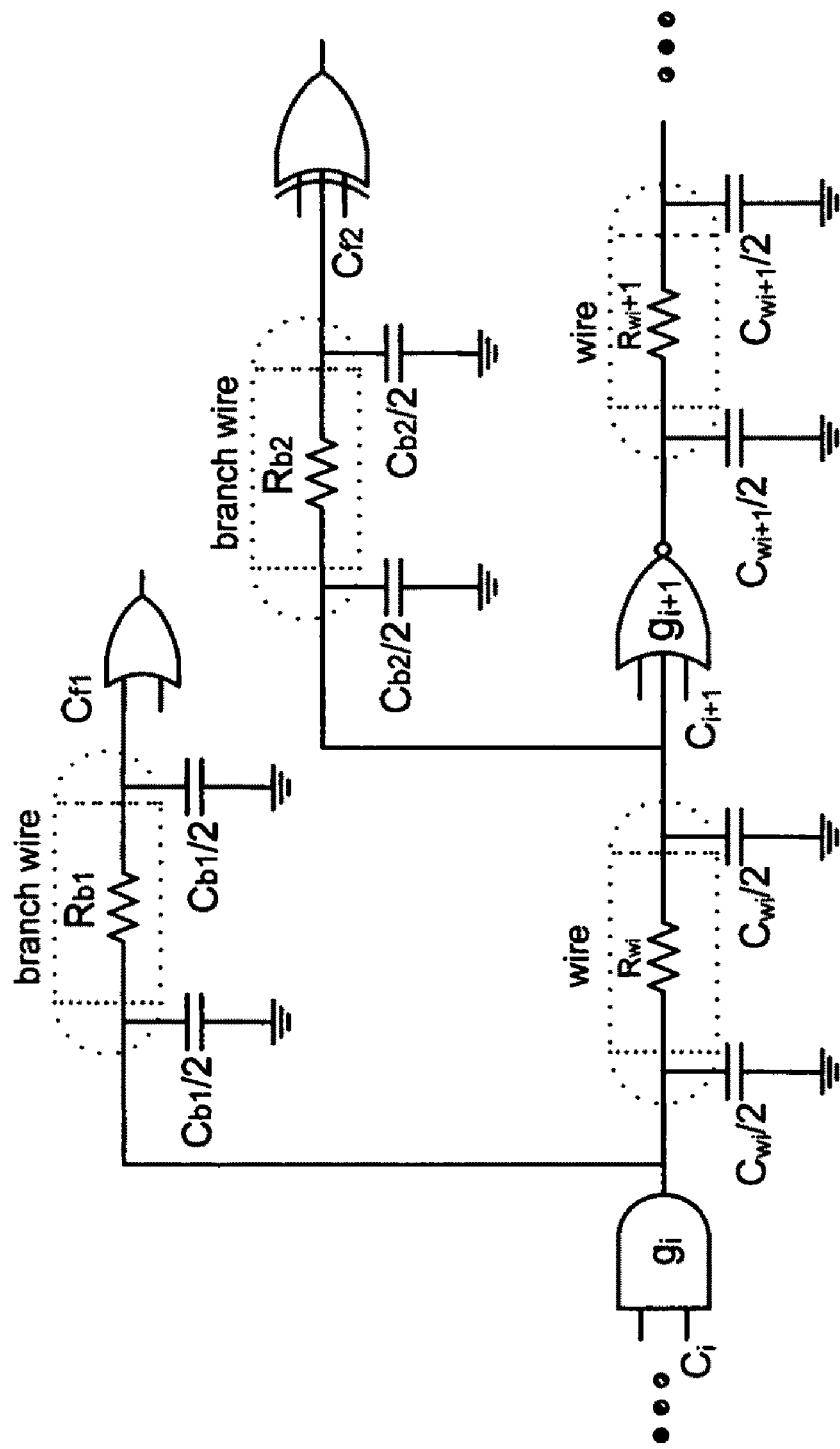
FIG. 7 is a simplified circuit diagram of an exemplary logic circuit diagram with branching and fanout.

Reference is now made to FIG. 7, which is a simplified circuit diagram of an exemplary logic circuit with branching and fanout. The circuit of FIG. 7 may be used to define a theoretical framework for delay minimization in circuits with side branches and multiple fanout. The circuit is representative of a general layout which contains a one or more side branches with RC interconnect and/or one or more fanout loads with arbitrary capacitance. Specifically, FIG. 7 shows logic path segment including RC interconnect and two branches. $R_b$ and $C_b$ are the resistance and capacitance of branch wires respectively, and $C_f$ is the fanout load capacitance.

The ULE expression of the total delay of stages i and i+1 including branches and fanout may be written similarly to Eqn. 9 as:

$$d = g_i \cdot \left[h_i + h_{w_i} + \frac{C_{b1_i} + C_{f1_i}}{C_i} + \frac{C_{b2_i} + C_{f2_i}}{C_i}\right] + \quad (34)$$

$$\frac{R_{w_i}}{\tau} \cdot \left[\frac{C_{w_i}}{2} + h_i \cdot C_i + C_{b2_i} + C_{f2_i}\right] + +$$

$$g_{i+1} \cdot \left[\frac{C_{w_{i+1}} + C_{i+2} + C_{b1_{i+1}} + C_{f1_{i+1}} + C_{b2_{i+1}} + C_{f2_{i+1}}}{h_i \cdot C_i}\right] +$$

$$\frac{R_{w_{i+1}}}{\tau} \cdot \left[\frac{C_{w_{i+1}}}{2} + C_{i+2} + C_{b2_{i+1}} + C_{f2_{i+1}}\right],$$

where $\tau = R_0 \cdot C_0$ is the minimum inverter delay.

The ULE condition for gate sizing is determined by equating the derivative of the delay with respect to the gate size to zero:

$$\frac{\partial d}{\partial h_i} = g_i + \frac{R_{w_i} \cdot C_i}{\tau} - \quad (35)$$

$$\frac{g_{i+1}}{C_i} \cdot \frac{C_{w_{i+1}} + C_{i+2} + C_{b1_{i+1}} + C_{f1_{i+1}} + C_{b2_{i+1}} + C_{f2_{i+1}}}{h_i^2} = 0,$$

$$\frac{g_{i+1} \cdot C_{i+1}}{C_i} \cdot \quad (36)$$

$$h_i^2 = \frac{\left(\frac{C_{w_{i+1}}}{C_{i+1}} + \frac{C_{i+2}}{C_{i+1}} + \frac{C_{b1_{i+1}} + C_{f1_{i+1}} + C_{b2_{i+1}} + C_{f2_{i+1}}}{C_{i+1}}\right)}{g_i + \frac{R_{w_i} \cdot C_i}{\tau}},$$

$$\left(g_i + \frac{R_{w_i} \cdot C_i}{\tau}\right) \cdot h_i = \quad (37)$$

$$g_{i+1} \cdot \left(h_{i+1} + h_{w_{i+1}} + \frac{C_{b1_{i+1}} + C_{f1_{i+1}} + C_{b2_{i+1}} + C_{f2_{i+1}}}{C_{i+1}}\right)$$

The branch wire resistance $R_{b_i}$ is not a part of the optimum condition, since it is not located along the path where the Elmore delay is calculated. Note that in circuits without multiple fanout or branch interconnects, this general ULE condition for gate sizing converges to Eqn. 13.

In some embodiments, Eqn. 36 is applied to each gate on the path in an iterative calculation procedure. In consequence, Eqn. 19 is replaced by:

$$C_i = \sqrt{\frac{g_i \cdot C_{i-1} \cdot (C_{w_i} + C_{i+1} + C_{b1_i} + C_{f1_i} + C_{b2_i} + C_{f2_i})}{g_{i-1} + \frac{R_{w_{i-1}} \cdot C_{i-1}}{\tau}}} = \quad (38)$$

$$= \sqrt{C_{i-1} + C_{i+1}} \cdot$$

$$\sqrt{1 + \frac{C_{w_i}}{C_{i+1}} + \frac{C_{b1_i} + C_{f1_i} + C_{b2_i} + C_{f2_i}}{C_{i+1}}} \cdot$$

$$\sqrt{\frac{g_f}{g_{i+1} + \frac{R_{w_{i-1}} \cdot C_{i-1}}{\tau}}}.$$

By using the relationship $(g_i \cdot \tau)/C_i = R_i$, an intuitive interpretation of the optimum condition may be derived similarly to Eqn. 14:

$$(R_{i-1} + R_{w_{i-1}}) \cdot C_i = R_i \cdot (C_{w_i} + C_{i+1} + C_{b1_{i+1}} + C_{f1_{i+1}} + C_{b2_{i+1}} + C_{f2_{i+1}}). \quad (39)$$

The load of the side branches is represented by $(C_{b1_{i+1}} + C_{f1_{i+1}})$ and $(C_{b2_{i+1}} + C_{f2_{i+1}})$.

Figure 8:
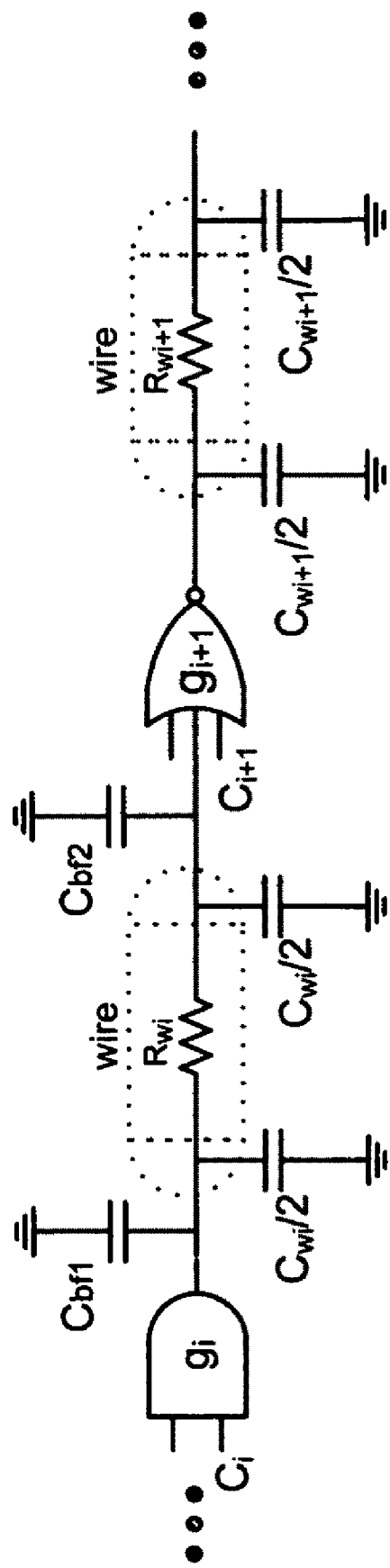
FIG. 8 is schematic model of an equivalent logic circuit.

Reference is now made to FIG. 8 which shows an equivalent circuit to that of FIG. 7, with the effective branch and fanout capacitances $C_{bf1}$ and $C_{bf2}$ in parallel with the path capacitances. These capacitances represent the effective capacitive loads of the branch wires and fanout gates shown in FIG. 7. Note that the resistances $R_{b1}$ and $R_{b2}$ of the wires on the fanout branches do not affect the Elmore delay of the path.

These ULE optimum expressions may be generalized for any combination of side branch wires and fanout gates by defining the total effective capacitance of the fanout branches for each stage of the path:

$$C_{BF} = \sum_1^n C_{b_n} + \sum_1^m C_{f_m}, \quad (40)$$

where n and m are the number of branch wires and fanout gates in a path stage, respectively. The general ULE conditions for gate sizing are determined from Eqn. 40 similarly to Eqns. 37-39:

$$\left(g_i + \frac{R_{w_i} \cdot C_i}{\tau}\right) \cdot h_i = g_{i+1} \cdot \left(h_{i+1} + h_{w_{i+1}} + \frac{C_{BF_{i+1}}}{C_{i+1}}\right), \quad (41)$$

$$C_i = \sqrt{C_{i-1} C_{i+1}} \cdot \sqrt{1 + \frac{C_{w_i}}{C_{i+1}} + \frac{C_{BF_i}}{C_{i+1}}} \cdot \sqrt{\frac{g_i}{g_{i-1} + \frac{R_{w_{i-1}} \cdot C_{i-1}}{\tau}}}, \quad (42)$$

$$(R_{i-1} + R_{w_{i-1}}) \cdot C_i = R_i \cdot (C_{w_i} + C_{i+1} + C_{BF_i}). \quad (43)$$

Figure 9:
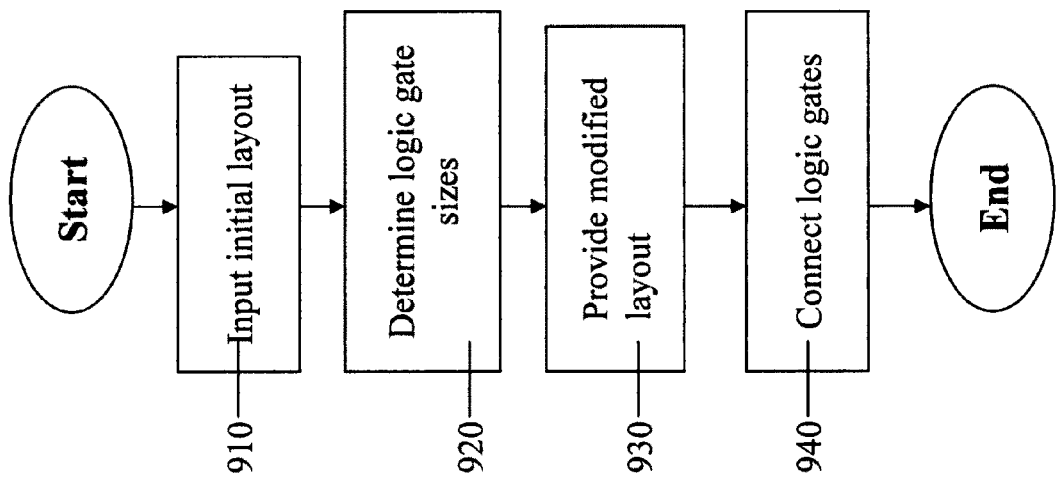
FIG. 9 is a simplified flowchart of a method for producing a logic circuit, according to an embodiment of the present invention.

Reference is now made to FIG. 9, which is a simplified flowchart of a method for producing a logic circuit, according to an embodiment of the present invention.

In 910 an initial layout of a physical electronic logic circuit is input. The initial layout includes multiple logic gates connected by conductive segments. The initial layout describes the interconnection between the logic gates, and may further include input and output conductive segments. Each of the logic gates has a respective type, and each of the conductive segments has a respective specified dimension.

In 920 a respective size is determined for each of the logic gates, in accordance with the initial layout and a circuit delay criterion. As described above, the circuit design criterion is a joint function of properties of at least some of the logic gates and at least some of the conductive segments. The determination of the logic gate sizes is performed substantially as described above, taking into account the details of the initial layout. In some embodiments, the properties of a logic gate include a respective output resistance and a respective input capacitance, and the properties of a conductive segment include a specified respective segment capacitance and a specified respective segment resistance.

In 930 a modified layout (i.e. design) of the logic circuit is provided. The design includes the logic gates arranged in accordance with the initial layout. Each of the logic gates is of the respective type specified by the initial layout. The size of the logic gates is modified to the respective sizes determined in 920.

In 940 the logic circuit is produced by connecting physical logic gates in accordance with the modified layout, the respective logic gate types, and the respective logic gates sizes specified by the design provided in 930. Thus a logic circuit with an optimized circuit delay is obtained.

Figure 10:
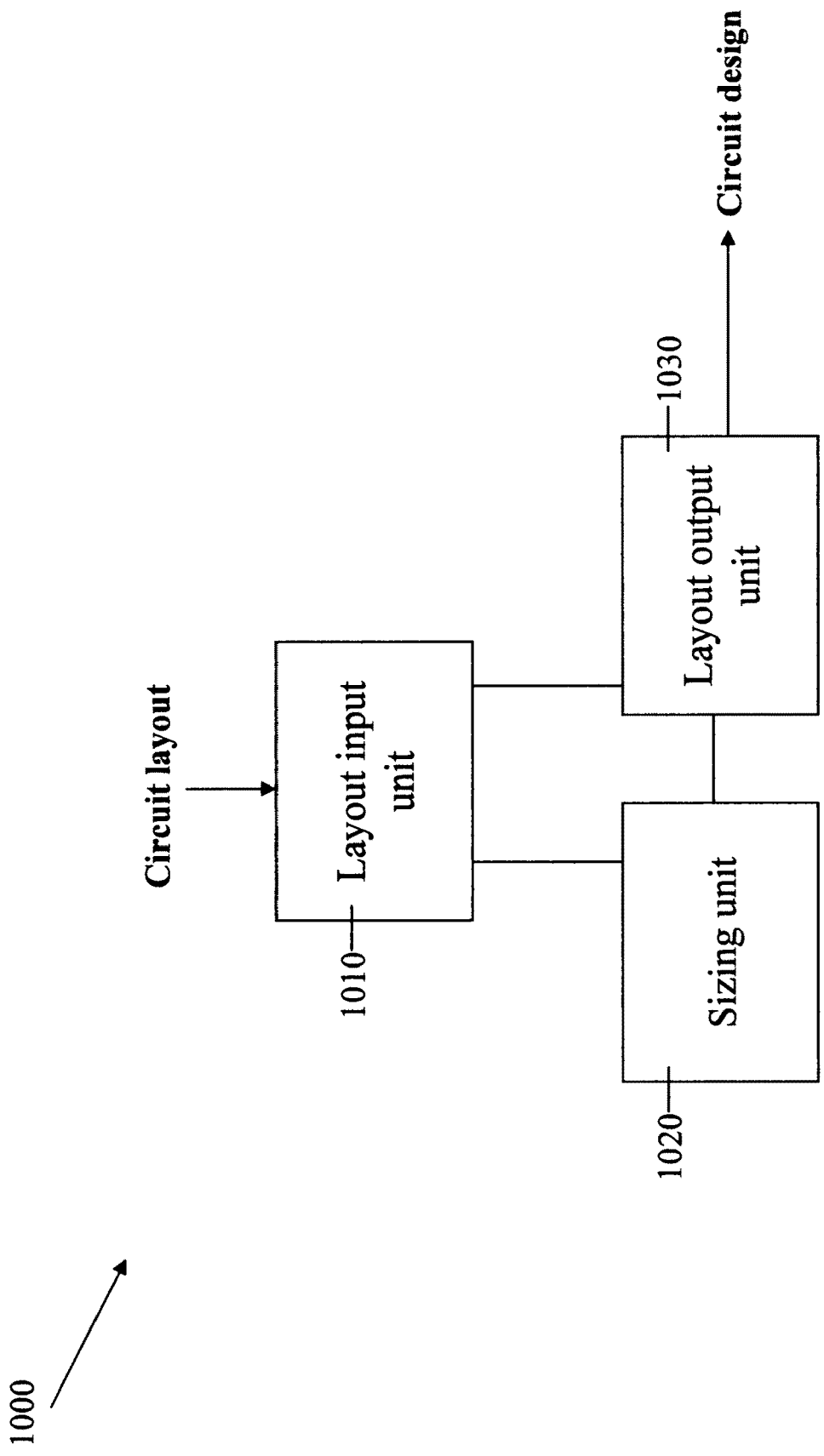
FIG. 10 is a simplified block diagram of an apparatus for designing a logic circuit, according to an embodiment of the present invention.

Reference is now made to FIG. 10, which is a simplified block diagram of an apparatus for designing a logic circuit, according to an embodiment of the present invention. Design apparatus 1000 includes layout input unit 1010, sizing unit 1020, and layout output unit 1030.

Layout input unit 1010 inputs the initial logic circuit layout. The initial layout specifies a plurality of logic gates interconnected by conductive segments between the logic gates. In some embodiments, layout input unit serves as a design tool which the designer uses to develop the initial logic circuit layout. The designer may select logic gates from a database, lay the logic gates out on a surface and specify the path and dimensions of the connecting segments. Alternately or additionally, the initial layout may be input in any way known in the art, for example as a data file.

Sizing unit 1020 determines a respective size for each of the logic gates in the initial layout, in accordance with a circuit delay criterion. As described above, the circuit design criterion comprises a joint function of properties of at least some of the logic gates and at least some of the interconnections. In some embodiments the properties of a logic gate include a respective output resistance and a respective input capacitance, and the properties of a conductive segment include a specified respective segment capacitance and a specified respective segment resistance. The determination of the logic gate sizes is performed substantially as described above, for the specified design criterion.

Layout output unit 1030 provides a modified layout (i.e. design) of the logic circuit with an optimized circuit delay. The design includes logic gates arranged in accordance with the initial layout, and the size of the logic gates is modified to the respective size determined in 1020. Each of the logic gates has the respective size determined by sizing unit 1020. Thus a logic circuit layout incorporating an optimized circuit propagation delay is obtained.

The ULE-based embodiments discussed herein, treat a broad scope of design problems with a single analytic model, which combines both logic and interconnect delay optimization. Optimal gate sizing is provided, making ULE suitable for integration into existing CAD tools. The ULE optimization approach may provide a solution to high-scale designs with a need for timing reduction in multiple paths, as well as design abilities that do not currently exist in Electronic Design Automation (EDA) products. The low complexity and fast run time of ULE makes the above-described embodiments a competitive alternative for integration into EDA toolsets that optimize complex logic structures with interconnect.

It is expected that during the life of a patent maturing from this application many relevant logic gates, logic circuits, logic circuit design methods and tools, logic circuit manufacture methods and apparatus and EDA toolsets will be developed, and the scope of the corresponding terms is intended to include all such new technologies a priori.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated support in the following examples.

EXAMPLES

Reference is now made to the following examples, which together with the above descriptions illustrate some embodiments of the invention in a non-limiting fashion. Examples 1-3 illustrate the properties of ULE gate sizing for different logic circuit configurations, using the total delay criterion. Examples 4-6 show comparative results between ULE, LE and Analog Optimization gate sizing for several circuit delay criteria.

Total Delay Criterion Examples

The ULE technique was applied to several example logic paths to demonstrate the properties of gate sizing. Parameters from the Cadence Virtuoso® Advanced Analysis Tools User Guide were used for a 65 nm CMOS technology. The parameters used include $R_0=8800\Omega$, $C_0=0.74$ fF, intermediate wires–$r_w=1.0$ $\Omega/\mu m$, $c_w=0.15$ fF/$\mu m$, global wires–$r_w=0.04$ $\Omega/\mu m$, and $c_w=0.23$ fF/$\mu m$.

Example 1

Total Delay Criterion

Figure 11:
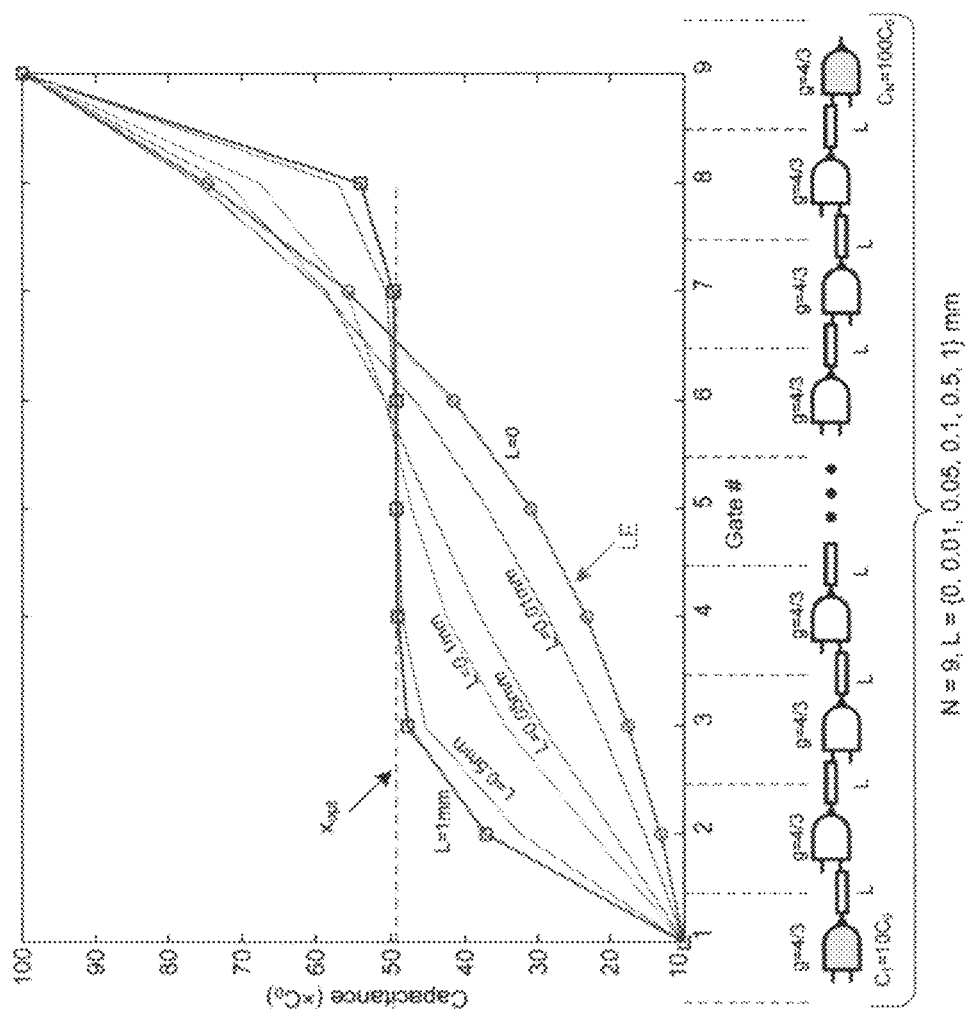
FIG. 11 is a simplified circuit diagram of an exemplary logic circuit.

A simplified circuit diagram of an exemplary logic circuit is shown in FIG. 11. The logic circuit consists of a chain of nine NAND gates with equal connecting wire segments of length L. The input capacitance of the first and last gates are $10 \cdot C_0$ and $100 \cdot C_0$ respectively. FIG. 11 also shows the size of the logic gates along the path for several values of wire length L between each stage. All of the solutions range between two limits.

For zero wire lengths, the solution converges to LE optimization (see I. Saastamoinen, T. Suutari, J. Isoaho, J. Nurmi, "Interconnect IP for gigascale SoC", ECCTD, pp. 116-120, 2001, and A. Morgenshtein, I. Cidon, A. Kolodny, R. Ginosar, "Comparative Analysis of Serial and Parallel Links in Networks-on-Chip", SoC, Finland, pp. 185-188, 2004).

For long wires the gate size in the middle stages of the path converges to a fixed value, $x_{opt} \cong 50$ (the dashed horizontal line), similarly to repeater insertion methods (see H. B. Bakoglu, "Circuits, Interconnections and Packaging for VLSI", Wesley-Wesley, pp. 194-219, 1990, and M. Moreinis, A. Morgenshtein, I. Wagner, and A. Kolodny, "Logic Gates as Repeaters (LGR) for Area-Efficient Timing Optimization," IEEE Trans. on Very Large Scale Integration Systems, vol. 14, no. 11, pp. 1276-1281, November 2006), as explained above.

Example 2

Total Delay Criterion

Figure 12:
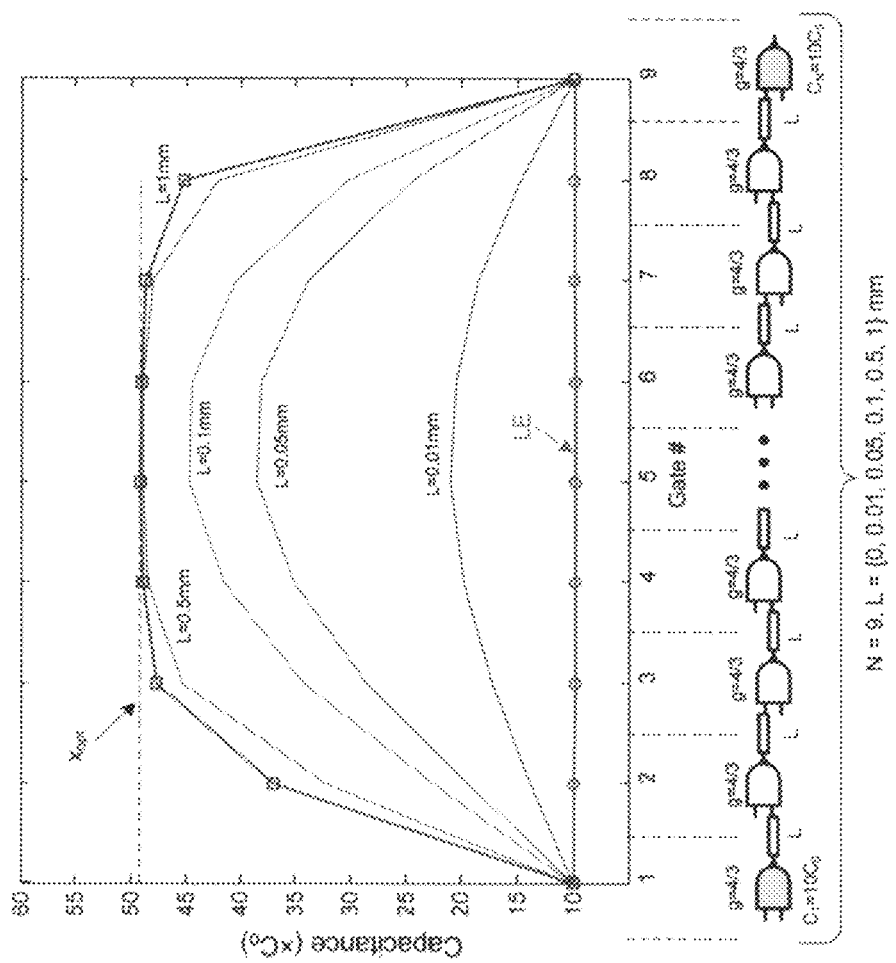
FIG. 12 is a simplified circuit diagram of an exemplary logic circuit.

A simplified circuit diagram of an exemplary logic circuit is shown in FIG. 12, for the case of total electrical effort H=1. The logic chain is similar to Example 1 (see FIG. 11), but the input and output gate capacitances are equal to $10 \cdot C_0$. In this case, the logical effort (LE) technique would result in no gate scaling in the absence of wires. Note that ULE optimization provides a sizing solution for a variety of wire lengths, while satisfying LE optimization (no scaling) in the case of zero wire length and converging to a fixed size for long wires.

Example 3

Total Delay Criterion

Figure 13:
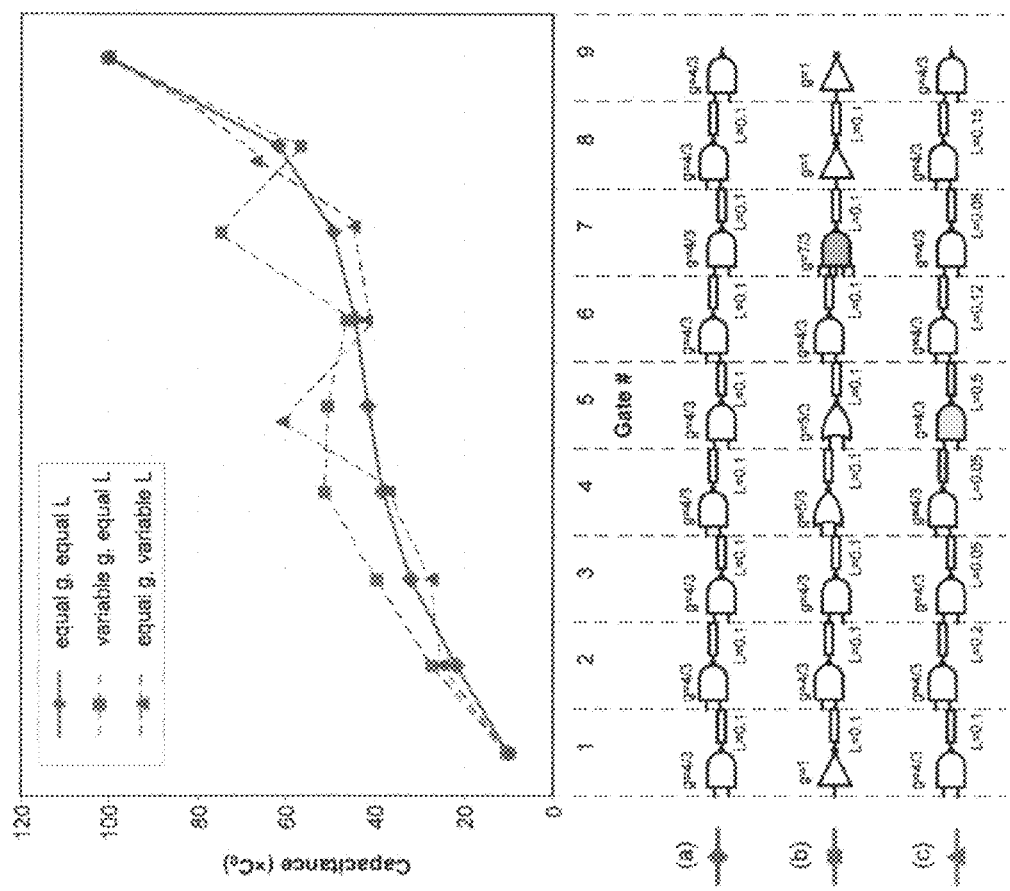
FIG. 13 illustrates the optimal gate size for three exemplary logic circuits.

Reference is now made to FIG. 13, which shows optimal gate sizes for the three exemplary logic circuits, a, b, and c, shown in the figure. The gate sizes are normalized with respect to $C_0$. The most irregular stages are highlighted.

In circuit a, all of the gates along the path are of similar type (NAND) with equal logical effort (g=4/3) and equal wire length. In circuit b, the path contains different types of logic gates but has equal wire lengths between each logic stage. In circuit c, the path contains similar types of logic gates but has different wire length between each logic gate. The total wire length is equal in all cases. It is seen from the graph that the optimal size changes as a function of $g_i$ and $L_i$, according to the optimization condition described by Eqn. 22.

As a result of the difference in driving capability, those gates with higher logical effort have a relatively larger scaling factor. The difference in the wire length between the stages has a similar effect on the optimal gate size. A larger size is required for all of the gates to drive longer interconnect segments. Note that due to the difference in gate type and wire length, the solution does not converge to a single equal size for the logic gates within the three circuits.

ULE Optimization Verification

ULE optimization was verified by comparison to the results of a commercial numerical optimizer which uses a circuit simulator for delay modeling. The Cadence Virtuoso® Analog Optimizer was used as the reference tool. The Analog Optimizer (AO) uses LSQ (least square) and CFSQP (C version Feasible Sequential Quadratic Programming) numerical algorithms were used to determine the value of the design variables that satisfy specific design goals.

The optimal solution is achieved with the Analog Optimizer by detecting the sensitivity of the expression to each design variable, and iteratively changing the variables and performing circuit simulations. The numerical methods in Analog Optimizer may be used to satisfy a variety of design specifications. In Examples 4-6, the design variable used by Analog Optimizer is the size of the gates along the critical path. Several circuits are considered—a four-bit carry-lookahead adder, a four-bit ripple-carry adder and a random logic block, each in 65 nm CMOS technology (see Predictive Technology Model, Internet website easdotasudotedu/~ptm/).

Example 4

Total Delay Criterion

The critical paths in the circuits were optimized according to Eqn. 22 for different lengths of inter-stage wires, using the total delay criterion. Each pair of adder stages is interconnected by a wire segment in a 65 nm CMOS technology. The ULE results are compared with the results of the Analog Optimizer tool.

FIG. 14A is a simplified circuit diagram of a carry-lookahead adder. A comparison of the resulting delay for the carry-lookahead adder, as evaluated by circuit simulation, is presented in FIG. 14B. The delay obtained after ULE optimization is close to the results achieved by the Analog Optimizer tool (within 9%). Note that the standard LE technique becomes increasingly inaccurate as the wire lengths grow.

Figure 14C:
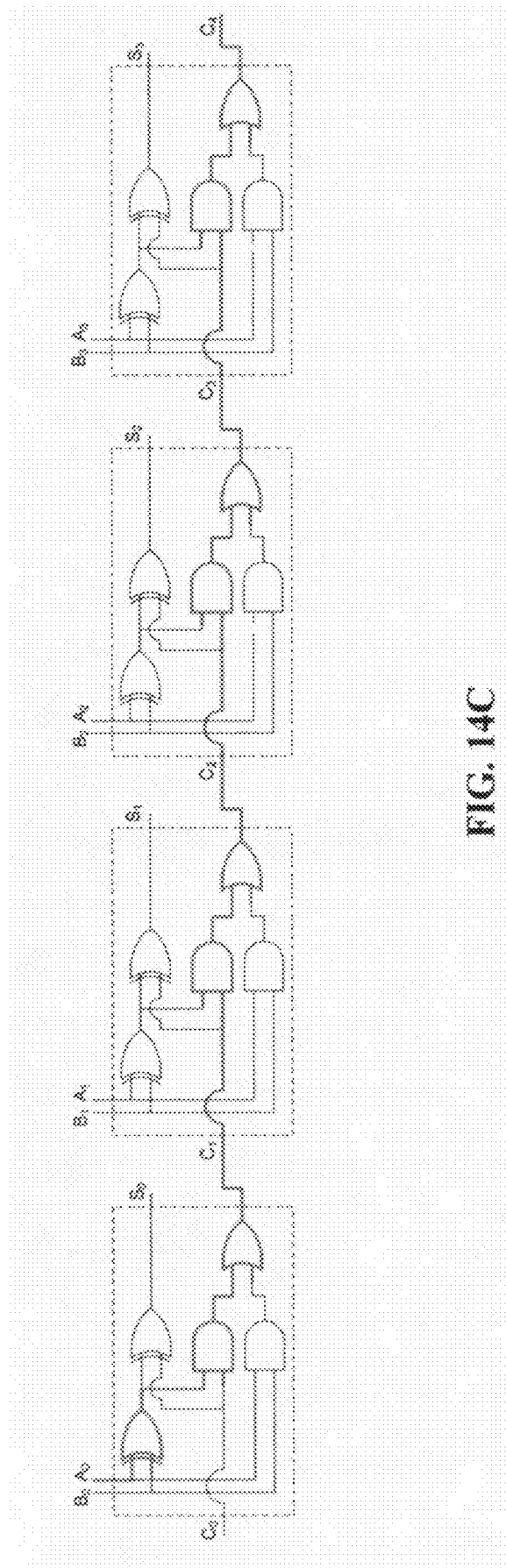
FIG. 14C is a simplified circuit diagram of a ripple carry adder.

FIG. 14C is a simplified circuit diagram of a carry-lookahead adder. A comparison of the computational run time for ULE vs. the Analog Optimizer are compared in Table 1 as a function of the length of the logic path (in this case the number of full adders in a ripple-carry adder path). Both techniques were used to optimize the critical path in the ripple carry adder with a varying number of full adder stages. Note that the run time of Analog Optimizer is orders of magnitude longer than the ULE run time.

TABLE 1

|  | Run Time [min] | | | |
|---|---|---|---|---|
| Number of stages | 2 | 4 | 6 | 8 |
| AO (1% precision) | 25 | 43 | 60 | 82 |
| AO (5% precision) | 18 | 25 | 32 | 39 |
| ULE (0.1% precision) | <1 sec | | | |

Example 5

Power-Delay Criterion

Figure 15A:
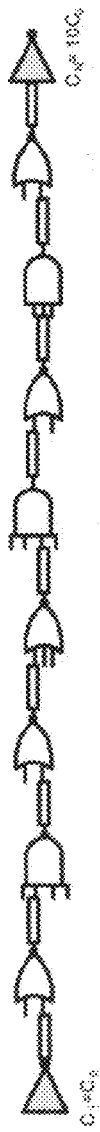
FIG. 15A is a simplified circuit diagram of a logic path containing ten stages of logic gates.

The power-delay product minimization is demonstrated on a random logic path containing ten stages of logic gate and interconnect, as shown in FIG. 15A. Four scenarios were considered:
  i) Equal wire lengths with L=100 μm (S1),
  ii) Equal wire lengths with L=80 μm (S2)
  iii) Equal wire lengths with L=400 μm (S3), and
  iv) Unequal wire lengths with L={900, 600, 150, 300, 800, 200, 400, 150, 250} μm (S4).

Figure 15B:
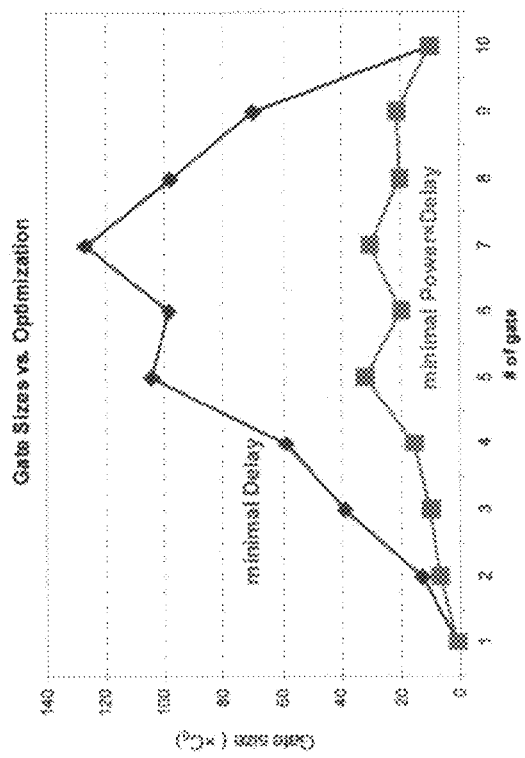
FIG. 15B is a comparison of the gate sizes resulting for the Total Delay Criterion vs. the Power-Delay Criterion.
Figure 15C:
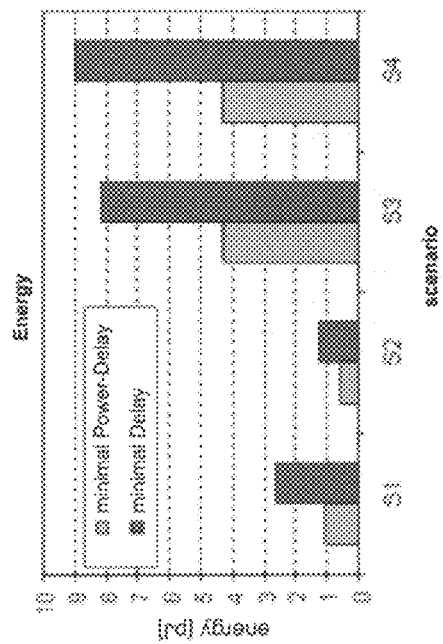
FIG. 15C shows logic circuit energy dissipation for the power-delay criterion and the total delay criterion.
Figure 15D:
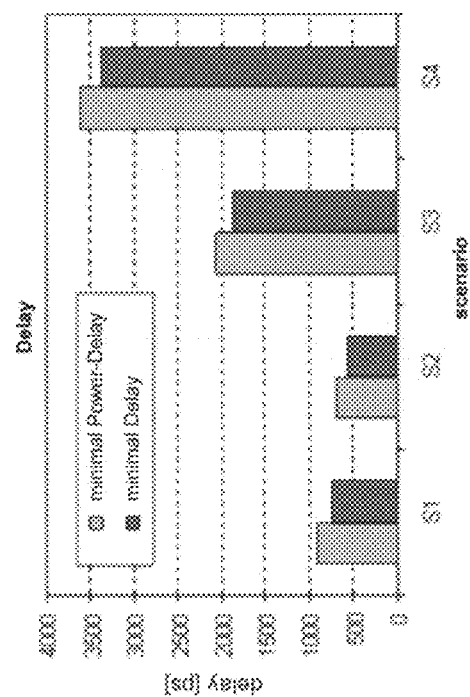
FIG. 15D shows logic circuit delay for the power-delay criterion and the total delay criterion.

FIG. 15B presents a comparison of the gate sizes resulting for the Total Delay Criterion vs. the Power-Delay Criterion in scenario S4. As can be seen, the sizing for power-delay minimization results in significantly smaller gate sizes. The effectiveness of the technique is evident from FIGS. 15C and 15D. FIG. 15C shows the energy of the logic circuit of FIG. 15A for the power-delay criterion as compared to the total delay criterion. FIG. 15D shows the delay of the logic circuit of FIG. 15A for the power-delay criterion as compared to the total delay criterion. FIGS. 15A-15D demonstrate that an energy reduction of more than 50% is achieved by compromising the performance by less than 10%.

Example 6

Sizing Patterns with Fanout and Branches

Figure 16A:
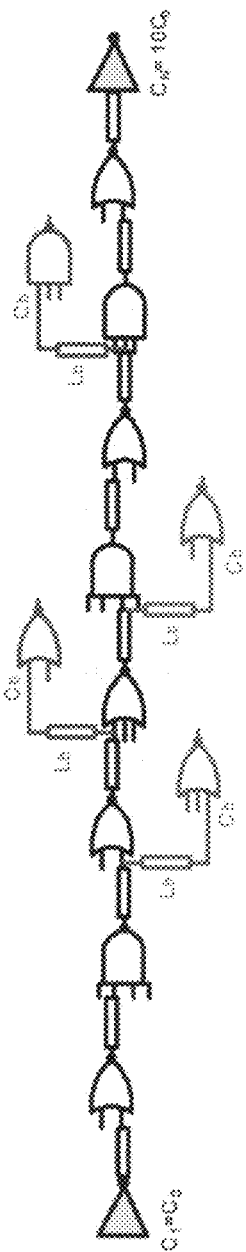
FIG. 16A is a simplified circuit diagram of a logic path with four branches.

The delay minimization in presence of branches and fanout is demonstrated on a random logic path which is similar to that of FIG. 15A. FIG. 16A is a simplified circuit diagram of a logic path with four branches, each containing a logic gate and RC interconnect. Four scenarios of branch wire lengths and fanout gates were assumed:
  i) Equal length and size–$L_b$=400 μM, $C_b$=1×$C_0$ (Scenario S1),
  ii) Equal length and size–$L_b$=400 μm, $C_b$=30×$C_0$ (Scenario S2),
  iii) Unequal length and size–$L_b$={400, 100, 400, 400} μm, $C_b$={30, 1, 30, 1}×$C_0$ (Scenario S3),
  iv) Unequal length and size–$L_b$={100, 100, 100, 400} μm, $C_b$={1, 1, 1, 30}×$C_0$ (Scenario S4).

Figure 16B:
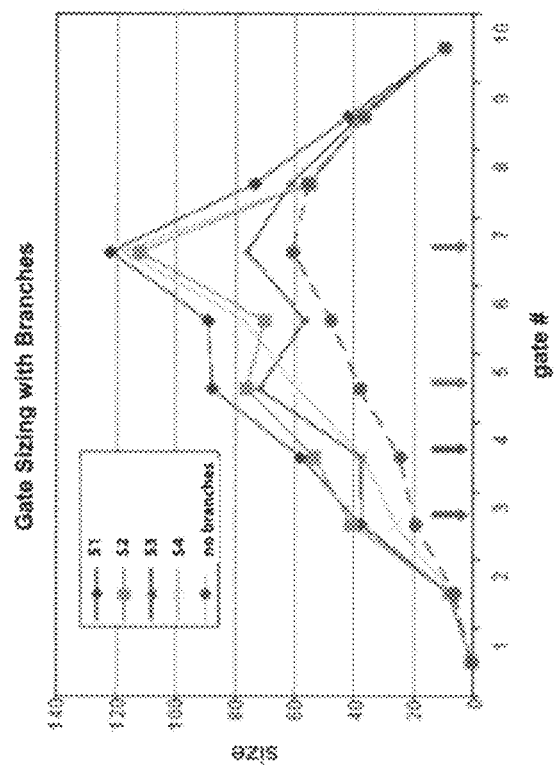
FIG. 16B shows gate sizes in logic circuit paths with branches and in logic circuit paths without branches.
Figure 16C:
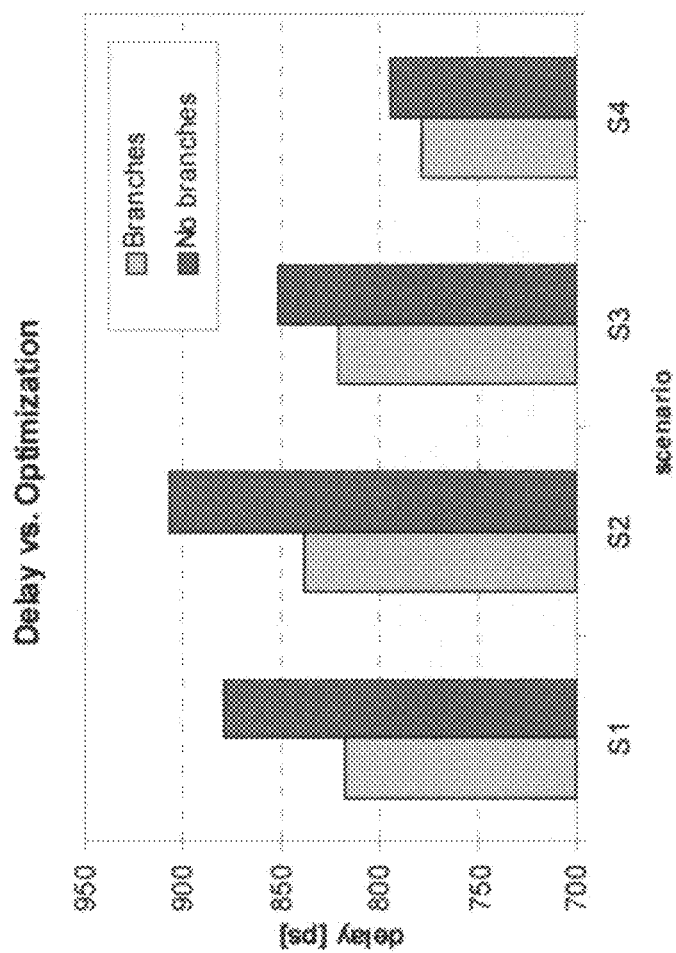
FIG. 16C shows the delay for logic circuits with and without branches.

FIG. 16B shows the gate sizes resulting from the total delay minimization in paths with branches vs. the gate sizes in paths without branches (the arrows mark the location of the branches along the path). As can be seen, the addition of a branch causes an increase in the size of the gate that drives the branch. FIG. 16C shows the delay for logic circuits with and without branches, for each of the scenarios. The effectiveness of the extended ULE optimization is evident from FIG. 16C. The delay of the path with branches is optimized here by using the basic ULE condition (Eqn. 13) and the extended ULE condition that accounts for branches. As expected, the inclusion of the branches and fanout components in the ULE optimization condition results in performance improvement, as compared to the basic formula that does not account for branches.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A processor-implemented method for modifying a logic circuit layout, the layout comprising a plurality of logic gates connected by conductive segments, the modification to optimize circuit propagation delays for improved circuit operation, the method comprising:
   inputting an initial layout of a physical electronic logic circuit having the plurality of logic gates;
   determining a respective size scaling factor for each of the logic gates in accordance with the initial layout and a minimum circuit delay criterion, wherein the minimum circuit delay criterion comprises a joint function of properties of at least some of the logic gates and at least some of the conductive segments; and
   outputting a modified logic circuit layout, wherein the modified logic circuit layout comprises a layout of the logic gates arranged in accordance with the initial layout, each of the logic gates being modified according to the respective determined size scaling factors, thereby to obtain a modification of the logic circuit layout incorporating an optimized circuit propagation delay;
   and wherein said determining comprises selecting a respective scaling factor for logic gate i as a function of:

$$x_{iopt} = \sqrt{\frac{R_0}{(R_{i-1} + R_{w_{i-1}})} \cdot \frac{(C_{i+1} + C_{w_i})}{C_0 \cdot g_i}}$$

where:
$x_{opti}$ equals the scaling factor;
$R_0$ equals a specified constant resistance;
$C_0$ equals a specified constant capacitance;
$R_{i-1}$ equals a respective output resistance of gate i−1;
$R_{wi}$ equals a respective resistance of a conductive segment between logic gates i and i+1;
$C_{i+1}$ equals a respective input capacitance of gate i+1;
$C_{wi}$ equals a respective capacitance of a conductive segment between logic gates i and i+1; and
$g_i$ equals the logical effort of gate i, and wherein the logical effort of gate i equals $(R_i*C_i)/(R_0*C_0)$.

2. A processor-implemented method according to claim 1, wherein said properties of a logic gate comprise a respective output resistance and a respective input capacitance.

3. A processor-implemented method according to claim 1, wherein said properties of a conductive segment comprise a specified respective segment capacitance and a specified respective segment resistance.

4. A processor-implemented method according to claim 1, further comprising specifying a respective length of a conductive segment, and determining the respective segment properties from the specified length.

5. A processor-implemented method according to claim 1, wherein the determining comprises selecting said respective scaling factor for a specified gate, such that a delay due to the respective gate capacitance equals a delay due to the respective specified output resistance.

6. A processor-implemented method according to claim 1, wherein the determining is performed iteratively along a logic path in the layout.

7. A processor-implemented method according to claim 1, wherein the determining is further in accordance with at least one of a branch and a fanout within the logic circuit layout.

8. A processor-implemented method according to claim 1, wherein selecting said respective scaling factor as a function of $X_{iopt}$ comprises setting said respective scaling factor equal to $X_{iopt}$.

9. A processor-implemented method for producing a logic circuit from a modified initial logic circuit layout, the layout comprising a plurality of logic gates connected by conductive segments and specifies a respective type of each of the logic gates and a respective dimension of each of the conductive segments, the modification to optimize circuit propagation delays for improved circuit operation, the method comprising:
   inputting an initial layout of a physical electronic logic circuit having the plurality of logic gates;
   determining from a circuit propagation delay criterion a respective size scaling factor for each of the logic gates in accordance with the initial layout, wherein the circuit propagation delay criterion comprises a function of properties of at least one property of at least one of the logic gates and of at least one property of at least one of the conductive segments;
   providing a modified logic circuit layout, wherein the modified layout comprises a layout of the logic gates and the conductive segments arranged in accordance with the initial layout, each of the logic gates being modified according to the respective determined size scaling factor; and
   connecting physical logic gates in accordance with the modified logic circuit layout, thereby to obtain a logic circuit with an optimized circuit propagation delay,
wherein the delay criterion comprises a minimum power-delay product and the determining comprises:
i) obtaining optimal respective input gate capacitances; and
ii) determining respective gate sizes in accordance with obtained input gate capacitances, the input gate capacitances being obtained by solving:

$$C_i^3 \cdot a_1 + C_i^2 \cdot a_2 + C_i \cdot a_3 + a_4 = 0,$$

$$a_1 = 2\left(g_{i-1} + \frac{R_{w_{i-1}} \cdot C_{i-1}}{\tau}\right)$$

$$a_2 = \begin{pmatrix} g_{i-1} \cdot (C_{w_{i-1}} + C_{w_i}) + \\ + \frac{R_{w_{i-1}} \cdot C_{i-1} \cdot (0.5 \cdot C_{w_{i-1}} + C_{w_i})}{\tau} + p_{w_i} \cdot C_{i-1} \end{pmatrix}$$

$$a_3 = 0$$

$$a_4 = -(g_i \cdot C_{w_i} \cdot C_{i-1} \cdot (C_{i+1} + C_{w_i}))$$

where:
$C_i$ equals an optimal input gate capacitance of logic gate i,
$R_{i-1}$ equals a respective output resistance of gate i−1,
$R_{wi-1}$ equals a respective resistance of a conductive segment between logic gates i−1 and i,
$C_{i-1}$ equals a respective input capacitance of gate i−1,
$C_{wi}$ equals a respective capacitance of a conductive segment between logic gates i and i+1,
$C_{w-i}$ equals a respective capacitance of a conductive segment between logic gates i−1 and i, $p_{wi}$ equals the resistive interconnect effort of a conductive segment between logic gates i and i+1, τ equals the delay of a minimum size inverter, and $g_i-1$ equals the logical effort of gate i−1, and wherein the logical effort of gate i−1 equals $(R_{i-1}*C_{i-1})/(R_0*C_0)$.

10. A processor-implemented method according to claim 9, wherein said properties of a logic gate comprise a respective output resistance and a respective input capacitance.

11. A processor-implemented method according to claim 9, and further comprising determining the respective logic gate properties in accordance with the logic gate type.

12. A processor-implemented method according to claim 9, wherein said properties of a conductive segment comprise a respective segment capacitance and a respective segment resistance.

13. A processor-implemented method according to claim 9, further comprising determining the conductive segment properties in accordance with a respective specified dimension.

14. A processor-implemented method according to claim 9, wherein the determining is further in accordance with at least one of a branch and a fanout within the logic circuit layout.

15. An apparatus for providing a logic circuit layout with optimized circuit propagation delay, the layout comprising a plurality of logic gates connected by conductive segments, the apparatus comprising:

a layout input unit, configured for specifying an initial layout of an electronic logic circuit having the plurality of logic gates connected by the conductive segments;

a sizing unit, configured for determining from a circuit propagation delay criterion a respective size scaling factor for each of the logic gates in accordance with the initial layout, wherein the circuit propagation delay criterion comprises a function of at least one property of at least one of the logic gates and of at least one property of at least one of the conductive segments; and a layout output unit associated with the layout input unit and the sizing unit, configured for outputting a modified layout, wherein the modified layout comprises a layout of the logic gates arranged in accordance with the initial layout, each of the logic gates being modified according to the respective determined size scaling factors, thereby to obtain a logic circuit layout incorporating an optimized circuit propagation delay, and wherein the delay criterion comprises a minimum circuit delay and the sizing unit is configured to select said respective scaling factor for logic gate i as a function of:

$$x_{i_{opt}} = \sqrt{\frac{R_0}{(R_{i-1}+R_{w_{i-1}})} \cdot \frac{(C_{i+1}+C_{w_i})}{C_0 \cdot g_i}}$$

where:

$x_{opti}$ equals the scaling factor;

$R_0$ equals a specified constant resistance;

$C_0$ equals a specified constant capacitance;

$R_{i-1}$ equals a respective output resistance of gate i−1;

$R_{wi}$ equals a respective resistance of a conductive segment between logic gates i and i+1:

$C_{i+1}$ equals a respective input capacitance of gate i+1;

$C_{wi}$ equals a respective capacitance of a conductive segment between logic gates i and i+1; and $g_i$ equals the logical effort of gate i, and wherein the logical effort of gate i equals $(R_i*C_i)/(R_0*C_0)$.

16. An apparatus according to claim 15, wherein said properties of a logic gate comprise a respective output resistance and a respective input capacitance.

17. An apparatus according to claim 15, wherein said properties of a conductive segment comprise a specified respective segment capacitance and a specified respective segment resistance.

18. An apparatus according to claim 15, wherein the layout input unit is configured to input a respective length of a conductive segment, and to determine the respective segment properties from the input length.

19. An apparatus according to claim 15, wherein the sizing unit is configured to determine the respective sizes by selecting said respective scaling factor for a specified gate such that a delay due to the respective gate capacitance equals a delay due to the respective specified output resistance.

20. An apparatus according to claim 15, wherein the sizing unit is configured to perform the determining iteratively along a logic path in the layout.

21. An apparatus according to claim 15, wherein the sizing unit is configured to determine the respective size scaling factors in accordance with at least one of a branch and a fanout within the logic circuit layout.

22. An apparatus according to claim 15, wherein selecting said respective scaling factor as a function of $X_{i_{opt}}$ comprises setting said respective scaling factor equal to $X_{i_{opt}}$.

23. A processor-implemented method for producing a logic circuit from a modified initial logic circuit layout, the layout comprising a plurality of logic gates connected by conductive segments and specifies a respective type of each of the logic gates and a respective dimension of each of the conductive segments, the modification to optimize circuit propagation delays for improved circuit operation, the method comprising:

inputting an initial layout of a physical electronic logic circuit having the plurality of logic gates;

determining from a circuit propagation delay criterion a respective size scaling factor for each of the logic gates in accordance with the initial layout, wherein the circuit propagation delay criterion comprises a function of properties of at least one property of at least one of the logic gates and of at least one property of at least one of the conductive segments;

providing a modified logic circuit layout, wherein the modified logic circuit layout comprises a layout of the logic gates and the conductive segments arranged in accordance with the initial layout, each of the logic gates being modified according to the respective determined size scaling factor; and connecting physical logic gates in accordance with the modified logic circuit layout, thereby to obtain a logic circuit with an optimized circuit propagation delay, and wherein the delay criterion comprises a minimum circuit delay and said determining comprises selecting said respective scaling factor for logic gate i as a function of:

$$x_{i_{opt}} = \sqrt{\frac{R_0}{(R_{i-1}+R_{w_{i-1}})} \cdot \frac{(C_{i+1}+C_{w_i})}{C_0 \cdot g_i}}$$

where:

$x_{opti}$ equals the scaling factor;

$R_0$ equals a specified constant resistance;

$C_0$ equals a specified constant capacitance;

$R_{i-1}$ equals a respective output resistance of gate i−1;

$R_{wi}$ equals a respective resistance of a conductive segment between logic gates i and i+1;

$C_{i+1}$ equals a respective input capacitance of gate i+1;

$C_{wi}$ equals a respective capacitance of a conductive segment between logic gates i and i+1; and $g_i$ equals the logical effort of gate i, and wherein the logical effort of gate i equals $(R_i * C_i)/(R_0 * C_0)$.

24. A processor-implemented method according to claim 23, wherein the determining comprises selecting said respective scaling factor for a specified gate such that a delay due to the respective gate capacitance equals a delay due to the respective specified output resistance.

25. A processor-implemented method according to claim 23, wherein selecting said respective scaling factor as a function of $X_{iopt}$ comprises setting said respective scaling factor equal to $X_{iopt}$.

26. A processor-implemented method for modifying a logic circuit layout, the layout comprising a plurality of logic gates connected by conductive segments, the modification to optimize circuit propagation delays for improved circuit operation, the method comprising:

inputting an initial layout of a physical electronic logic circuit having the plurality of logic gates;

determining a respective size scaling factor for each of the logic gates in accordance with the initial layout and a circuit propagation delay criterion, wherein the circuit propagation delay criterion comprises a joint function of properties of at least one property of at least one of the logic gates and at least one property of at least one of the conductive segments; and outputting a modified logic circuit layout, wherein the modified logic circuit layout comprises a layout of the logic gates arranged in accordance with the initial layout, each of the logic gates being modified according to the respective determined size scaling factor, thereby to obtain a modification of the logic circuit layout incorporating an optimized circuit propagation delay, and wherein said delay criterion comprises a minimum power-delay product and said determining comprises:

i) obtaining optimal respective input gate capacitances; and ii) determining respective gate sizes in accordance with the obtained capacitances, said input gate capacitances being obtained by solving:

$$C_i^3 \cdot a_1 + C_i^2 \cdot a_2 + C_i \cdot a_3 + a_4 = 0,$$

$$a_1 = 2\left(g_{i-1} + \frac{R_{w_{i-1}} \cdot C_{i-1}}{\tau}\right)$$

$$a_2 = \left(\begin{array}{c} g_{i-1} \cdot (C_{w_{i-1}} + C_{w_i}) + \\ + \dfrac{R_{w_{i-1}} \cdot C_{i-1} \cdot (0.5 \cdot C_{w_{i-1}} + C_{w_i})}{\tau} + p_{w_i} \cdot C_{i-1} \end{array}\right)$$

$$a_3 = 0$$

$$a_4 = -(g_i \cdot C_{w_i} \cdot C_{i-1} \cdot (C_{i+1} + C_{w_i}))$$

where:

$C_i$ equals an optimal input gate capacitance of logic gate i, $R_{i-1}$ equals a respective output resistance of gate i−1, $R_{wi-1}$ equals a respective resistance of a conductive segment between logic gates i−1 and i, $C_{i-1}$ equals a respective input capacitance of gate i−1, $C_{wi}$ equals a respective capacitance of a conductive segment between logic gates i and i+1, $C_{w-i}$ equals a respective capacitance of a conductive segment between logic gates i−1 and i, $p_{wi}$ equals the resistive interconnect effort of a conductive segment between logic gates i and i+1, $\tau$ equals the delay of a minimum size inverter, and $g_i-1$ equals the logical effort of gate i−1, and wherein the logical effort of gate i−1 equals $(R_{i-1} * C_{i-1})/(R_0 * C_0)$.

27. A processor-implemented method according to claim 26, wherein said properties of a logic gate comprise a respective output resistance and a respective input capacitance.

28. A processor-implemented method according to claim 26, wherein said properties of a conductive segment comprise a specified respective segment capacitance and a specified respective segment resistance.

29. A processor-implemented method according to claim 26, further comprising specifying a respective length of a conductive segment, and determining the respective segment properties from the specified length.

30. A processor-implemented method according to claim 26, wherein the determining is performed iteratively along a logic path in the layout.

31. A processor-implemented method according to claim 26, wherein the determining is further in accordance with at least one of a branch and a fanout within the logic circuit layout.

32. An apparatus for providing a logic circuit layout with optimized circuit propagation delay, the layout comprising a plurality of logic gates connected by conductive segments, the apparatus comprising:

a layout input unit, configured for specifying an initial layout of an electronic logic circuit having the plurality of logic gates connected by the conductive segments;

a sizing unit, configured for determining from a circuit propagation delay criterion a respective size scaling factor for each of the logic gates in accordance with the initial layout, wherein the circuit propagation delay criterion comprises a function of at least one property of at least one of the logic gates and of at least one property of at least one of the conductive segments; and a layout output unit associated with the layout input unit and the sizing unit, configured for outputting a modified layout, wherein the modified layout comprises a layout of the logic gates arranged in accordance with the initial layout, each of the logic gates being modified according to the respective determined size scaling factors, thereby to obtain a logic circuit layout incorporating an optimized circuit propagation delay, wherein the delay criterion comprises a minimum power-delay product and wherein the sizing unit is configured to determine respective gate sizes in accordance with input gate capacitances, and further configured to determine the input gate capacitances by solving:

$$C_i^3 \cdot a_1 + C_i^2 \cdot a_2 + C_i \cdot a_3 + a_4 = 0,$$

$$a_1 = 2\left(g_{i-1} + \frac{R_{w_{i-1}} \cdot C_{i-1}}{\tau}\right)$$

$$a_2 = \left(\begin{array}{c} g_{i-1} \cdot (C_{w_{i-1}} + C_{w_i}) + \\ + \dfrac{R_{w_{i-1}} \cdot C_{i-1} \cdot (0.5 \cdot C_{w_{i-1}} + C_{w_i})}{\tau} + p_{w_i} \cdot C_{i-1} \end{array}\right)$$

$$a_3 = 0$$

$$a_4 = -(g_i \cdot C_{w_i} \cdot C_{i-1} \cdot (C_{i+1} + C_{w_i}))$$

where:

$C_i$ equals an optimal input gate capacitance of logic gate i, $R_{i-1}$ equals a respective output resistance of gate i−1, $R_{wi-1}$ equals a respective resistance of a conductive segment between logic gates i−1 and i, $C_{i-1}$ equals a respective input capacitance of gate i−1, $C_{wi}$ equals a respective capacitance of a conductive segment between logic gates i and i+1, $C_{w-i}$ equals a respective capacitance of a conductive segment between logic gates i−1 and i, $p_{wi}$ equals the resistive interconnect effort of a conductive segment between logic gates i and i+1, $\tau$ equals the delay of a minimum size inverter, and $g_i$−1 equals the logical effort of gate i−1, and wherein the logical effort of gate i−1 equals $(R_{i-1}*C_{i-1})/(R_0*C_0)$.

* * * * *